US009096189B2

(12) United States Patent
Golden

(10) Patent No.: US 9,096,189 B2
(45) Date of Patent: Aug. 4, 2015

(54) MULTI SENSOR DETECTION, STALL TO STOP AND LOCK DISABLING SYSTEM

(71) Applicant: Larry Golden, Mauldin, SC (US)

(72) Inventor: Larry Golden, Mauldin, SC (US)

( * ) Notice: Subject to any disclaimer, the term of this patent is extended or adjusted under 35 U.S.C. 154(b) by 0 days.

(21) Appl. No.: 14/021,693

(22) Filed: Sep. 9, 2013

(65) Prior Publication Data

US 2014/0071274 A1 Mar. 13, 2014

Related U.S. Application Data

(60) Continuation of application No. 13/288,065, filed on Nov. 3, 2011, now Pat. No. 8,531,280, which is a division of application No. 12/802,001, filed on May 27, 2010, now Pat. No. 8,334,761, which is a continuation of application No. 12/657,356, filed on Jan. 20, 2010, now Pat. No. 8,106,752.

(51) Int. Cl.
| | |
|---|---|
| *B60R 25/10* | (2013.01) |
| *B60R 25/102* | (2013.01) |
| *B60R 25/01* | (2013.01) |
| *B60R 25/04* | (2013.01) |
| *G07C 9/00* | (2006.01) |
| *G08B 15/00* | (2006.01) |
| *G08B 21/12* | (2006.01) |

(52) U.S. Cl.
CPC ............. *B60R 25/102* (2013.01); *B60R 25/018* (2013.01); *B60R 25/04* (2013.01); *G07C 9/00912* (2013.01); *G08B 15/00* (2013.01); *G08B 21/12* (2013.01); *B60R 2325/205* (2013.01); *B60R 2325/304* (2013.01); *G07C 2009/0092* (2013.01)

(58) Field of Classification Search
CPC ... B60R 2325/00; G08B 21/12; G08B 25/009

USPC ............. 340/539.1, 539.11, 539.13, 539.16, 340/539.17, 539.22, 539.25, 539.26, 540, 340/573.1, 574; 348/143; 380/228, 229, 380/232; 382/103, 115; 702/32

See application file for complete search history.

(56) References Cited

U.S. PATENT DOCUMENTS

| | | | |
|---|---|---|---|
| 4,385,469 | A | 5/1983 | Scheuerpflug |
| 4,544,267 | A | 10/1985 | Schiller |
| 4,586,441 | A | 5/1986 | Zekich |
| 4,792,226 | A | 12/1988 | Fishbine |
| 5,222,152 | A | 6/1993 | Fishbine |

(Continued)

OTHER PUBLICATIONS

United States Patent and Trademark Office; Office Action from U.S. Appl. No. 11/397,118; mailed Nov. 14, 2007; Alexandria, Virginia, USA; pp. 1-12; parent U.S. Appl. No. 13/288,065 (12 pages).

(Continued)

*Primary Examiner* — Van Trieu

(57) ABSTRACT

A multi sensor detection and disabling lock system includes detector cases for holding interchangeable detectors that sample for chemical, biological and radiological compounds, agents and elements, with each detector case disposed in or upon the monitored product. The detector case transmits detection information to a monitoring computer terminal and transmits a signal to a lock disabler engaged to the product to lock or disable the product's lock thereby preventing untrained, unauthorized and unequipped individual's from gaining access and entry to the product, and also preventing further contamination of the area. The detection system can be interconnected to surveillance towers scanning detector cases disposed at seaport docks, freight depots and rail terminals for monitoring containers being prepared for shipment or sitting on docks for long periods of time.

9 Claims, 13 Drawing Sheets

(56) References Cited

U.S. PATENT DOCUMENTS

| | | | |
|---|---|---|---|
| 5,223,844 | A | 6/1993 | Mansell et al. |
| 5,233,404 | A | 8/1993 | Lougheed |
| 5,557,254 | A | 9/1996 | Johnson |
| 5,682,133 | A | 10/1997 | Johnson |
| 5,766,956 | A | 6/1998 | Groger |
| 5,938,706 | A | 8/1999 | Feldman |
| 5,959,529 | A | 9/1999 | Kail, IV |
| 5,963,657 | A | 10/1999 | Bowker |
| 5,986,543 | A | 11/1999 | Johnson |
| 5,990,785 | A * | 11/1999 | Suda .................. 340/426.21 |
| 6,049,269 | A | 4/2000 | Byrd |
| 6,078,265 | A | 6/2000 | Bonder |
| 6,262,656 | B1 | 7/2001 | Byrd |
| 6,271,745 | B1 | 8/2001 | Arizal |
| 6,374,652 | B1 | 4/2002 | Hwang |
| 6,411,887 | B1 | 6/2002 | Martens |
| 6,470,260 | B2 | 10/2002 | Martens |
| 6,542,076 | B1 | 4/2003 | Joao |
| 6,542,077 | B2 | 4/2003 | Joao |
| 6,588,635 | B2 | 7/2003 | Vor Keller |
| 6,610,977 | B2 | 8/2003 | Megerle |
| 6,613,571 | B2 | 9/2003 | Cordery |
| 6,628,813 | B2 | 9/2003 | Scott |
| 6,647,328 | B2 | 11/2003 | Walker |
| 6,738,697 | B2 | 5/2004 | Breed |
| 6,923,509 | B1 | 8/2005 | Barnett |
| 6,980,092 | B2 | 12/2005 | Turnbull |
| 6,988,026 | B2 | 1/2006 | Breed et al. |
| 7,005,982 | B1 | 2/2006 | Frank |
| 7,034,677 | B2 * | 4/2006 | Steinthal et al. ......... 340/539.12 |
| 7,034,683 | B2 | 4/2006 | Ghazarian |
| 7,103,460 | B1 | 9/2006 | Breed |
| 7,109,859 | B2 | 9/2006 | Peeters |
| 7,116,798 | B1 | 10/2006 | Chawla |
| 7,148,484 | B2 | 12/2006 | Craig et al. |
| 7,164,117 | B2 | 1/2007 | Breed et al. |
| 7,171,312 | B2 * | 1/2007 | Steinthal et al. ................ 702/32 |
| 7,243,945 | B2 | 7/2007 | Breed et al. |
| 7,339,469 | B2 | 3/2008 | Braun |
| 7,346,439 | B2 | 3/2008 | Bodin |
| 7,385,497 | B2 | 6/2008 | Golden |
| 7,397,363 | B2 | 7/2008 | Joao |
| 7,636,033 | B2 | 12/2009 | Golden |
| 7,647,180 | B2 | 1/2010 | Breed |
| 7,844,505 | B1 | 11/2010 | Arneson et al. |
| 7,868,912 | B2 * | 1/2011 | Venetianer et al. ............ 348/143 |
| 7,872,575 | B2 | 1/2011 | Tabe |
| 7,880,767 | B2 * | 2/2011 | Chinigo ........................ 348/148 |
| 7,961,094 | B2 | 6/2011 | Breed |
| 8,274,377 | B2 | 9/2012 | Smith et al. |
| 8,531,521 | B2 * | 9/2013 | Romanowich ................ 348/143 |
| 8,564,661 | B2 * | 10/2013 | Lipton et al. .................. 348/143 |
| 2002/0145666 | A1 * | 10/2002 | Scaman et al. ................. 348/148 |
| 2003/0063004 | A1 * | 4/2003 | Anthony et al. .............. 340/574 |
| 2003/0137426 | A1 * | 7/2003 | Anthony et al. .............. 340/574 |
| 2003/0206102 | A1 | 11/2003 | Joao |
| 2004/0107028 | A1 | 6/2004 | Catalano |
| 2004/0222092 | A1 | 11/2004 | Musho |
| 2005/0195069 | A1 | 9/2005 | Dunand |
| 2006/0164239 | A1 | 7/2006 | Loda |
| 2006/0176169 | A1 * | 8/2006 | Doolin et al. .................. 340/521 |
| 2006/0181413 | A1 | 8/2006 | Mostov |
| 2006/0250235 | A1 | 11/2006 | Astrin |
| 2007/0171042 | A1 | 7/2007 | Metes et al. |
| 2008/0045156 | A1 | 2/2008 | Sakhpara |
| 2008/0122595 | A1 | 5/2008 | Yamamichi |
| 2008/0234907 | A1 | 9/2008 | Labuhn |
| 2010/0159983 | A1 | 6/2010 | Golden |
| 2011/0178655 | A1 | 7/2011 | Golden |

OTHER PUBLICATIONS

United States Patent and Trademark Office; Office Action from U.S. 12/155,573; mailed Apr. 9, 2009; Alexandria, Virginia, USA; pp. 1-7; parent U.S. Appl. No. 13/288,065 (7 pages).

United States Patent and Trademark Office; Office Action from U.S. 12/155,573; mailed Jul. 30, 2009; Alexandria, Virginia, USA; pp. 1-9; parent U.S. Appl. No. 13/288,065 (9 pages).

United States Patent and Trademark Office; Notice of Allowability from U.S. 12/155,573; mailed Oct. 28, 2009; Alexandria, Virginia, USA; pp. 1-5; parent U.S. Appl. No. 13/288,065 (5 pages).

United States Patent and Trademark Office; Office Action from U.S. Appl. No. 12/657,356; mailed Jul. 12, 2010; Alexandria, Virginia, USA; pp. 1-14; parent U.S. Appl. No. 13/288,065 (14 pages).

United States Patent and Trademark Office; Notice of Allowability from U.S. 12/657,356; mailed Mar. 10, 2011; Alexandria, Virginia, USA; pp. 1-4; parent U.S. Appl. No. 13/288,065 (4 pages).

United States Patent and Trademark Office; Office Action from U.S. Appl. No. 13/065,837; mailed Jul. 18, 2011; Alexandria, Virginia, USA, pp. 1-9; parent U.S. Appl. No. 13/288,065 (4 pages).

A newspaper article of Mr. Melvin Sullivan and his family that references the date, Mar. 6, 2001; parent U.S. Appl. No. 13/288,065.

A letter of response Mr. Sullivan received from Pfeiffer & Gantt, PA, dated Sep. 16, 2002; parent U.S. Appl. No. 13/288,065.

A "Certificate of Existance" Bright Idea Inventor, LLC. Nov. 6, 2002; parent U.S. Appl. No. 13/288,065.

Operating Agreement of Bright Idea Inventor, LLC received from Pfeiffer & Gantt, PA, dated Nov. 13, 2002; parent U.S. Appl. No. 13/288,065.

A letter of response Golden received from the Honorable Congressman from Maryland, Elijah E. Cummings, dated Dec. 16, 2002; parent U.S. Appl. No. 13/288,065.

A newspaper article of Mr. Melvin Sullivan and Mr. Larry Golden, dated, Feb. 27-Mar. 5, 2003; parent U.S. Appl. No. 13/288,065.

A letter of response Golden received from the Honorable Senator from South Carolina, Ernest F. Hollings, dated May 21, 2003; parent U.S. Appl. No. 13/288,065.

A letter of response Golden received from the Office of the Vice President, Dick Cheney, dated Jun. 3, 2003; parent U.S. Appl. No. 13/288,065.

A letter of response Golden received from the Honorable Senator from South Carolina, Ernest F. Hollings, dated Oct. 1, 2003; parent U.S. Appl. No. 13/288,065.

A letter of response Golden received from the Honorable Senator from South Carolina, Lindsey O. Graham, dated Oct. 21, 2003; parent U.S. Appl. No. 13/288,065.

A letter sent to the President of the United States George W Bush, the President's Cabinet, the United States Senate and the Congressional Black Caucus, dated May 23, 2005; parent U.S. Appl. No. 13/288,065.

On Nov. 17, 2005, an "Inventor's Official Record of Invention", was filed in my name (Golden) at "The Law Office of David P. Gaudio, P.C.; the Inventors Network."; parent U.S. Appl. No. 13/288,065.

On Aug. 23, 2005, the "Disclosure Document Registration"; parent U.S. Appl. No. 13/288,065.

On Apr. 5, 2006, the "Patent Application" was filed in my name (Golden) at the United Staets Patent & Trademark Office in Washington, D.C.; parent U.S. Appl. No. 13/288,065.

On Jun. 6, 2008, the "Continuance-In-Part, (CIP) Application" was filed in my name (Golden) at the United States Patent & Trademark Office in Washington, D.C.; parent U.S. Appl. No. 13/288,065.

On Jan. 20, 2010, a "Continuation Application" (U.S. Appl. No. 12/657,356) was filed in my name (Golden) at the United States Patent & Trademark Office in Washington, D.C.; parent U.S. Appl. No. 13/288,065.

Reissue of U.S. Pat. No. 7,636,033;"Swear Back"; in accordance to Title 37—Code of Federal Regulations Patents, Trademarks, and Copyrights; Apr. 8, 2011; parent U.S. Appl. No. 13/288,065

Reissue of U.S. Pat. No. 7,636,033; "Swearback—History of Work"; Apr. 8, 2011; parent U.S. Appl. No. 13/288,065

United States Patent and Trademark Office; Office Action from U.S. 12/802,001; mailed Apr. 14, 2011; Alexandria, Virginia, USA; pp. 1-16; parent U.S. Appl. No. 13/288,065 (16 pages)

United States Patent and Trademark Office; Office Action from U.S. Appl. No. 12/802,001; mailed Oct. 20, 2011; Alexandria, Virginia, USA; pp. 1-5; parent U.S. Appl. No. 13/288,065 (5 pages).

(56) References Cited

OTHER PUBLICATIONS

United States Patent and Trademark Office; Office Action from U.S. Appl. No. 12/802,001; mailed May 27, 2011; Alexandria, Virginia, USA; pp. 1-14; parent U.S. Appl. No. 13/288,065 (14 pages)
United States Patent and Trademark Office; Office Action; Office Action from U.S. Appl. No. 12/802,001; copyright and mailing date Dec. 12, 2011, pp. 1-9, publisher United States Patent and Trademark Office, Alexandria, Virginia, USA; parent U.S. Appl. No. 13/288,065 (9 pages).
United States Patent and Trademark Office; Office Action, Office Action from U.S. Appl. No. 13/065,837; copyright and mailing date Dec. 2, 2011, pp. 1-27, publisher United States Patent and Trademark Office, Alexandria, Virginia, USA; parent U.S. Appl. No. 13/288,065 (27 pages).
United States Patent and Trademark Office; Office Action; Office Action from U.S. Appl. No. 13/065,837; copyright and mailing date Nov. 1, 2011, pp. 1-18, publisher United States Patent and Trademark Office, Alexandria, Virginia, USA; parent U.S. Appl. No. 13/288,065 (18 pages).
United States Patent and Trademark Office; Office Action; Office Action from U.S. Appl. No. 13/199,853; copyright and mailing date Jan. 13, 2012, pp. 1-34, publisher United States Patent and Trademark Office, Alexandria, Virginia, USA; parent U.S. Appl. No. 13/288,065 (34 pages).
United States Patent and Trademark Office; Office Action; Office Action from U.S. Appl. No. 12/802,001; copyright and mailing date Mar. 26, 2012, pp. 1-12, publisher United States Patent and Trademark Office, Alexandria, Virginia, USA; parent U.S. Appl. No. 13/288,065 (12 pages).
United States Patent and Trademark Office; Office Action; Office Action from U.S. Appl. No. 13/199,853; copyright and mailing date Feb. 22, 2012, pp. 1-38, publisher United States Patent and Trademark Office, Alexandria, Virginia, USA; parent U.S. Appl. No. 13/288,065 (38 pages).
United States Patent and Trademark Office; Office Action; Office Action from U.S. Appl. No. 13/065,837; copyright and mailing date Feb. 22, 2012, pp. 1-25, publisher United States Patent and Trademark Office, Alexandria, Virginia, USA; parent U.S. Appl. No. 13/288,065 (25 pages).
United States Patent and Trademark Office; Office Action; Office Action from U.S. Appl. No. 13/288,065; copyright and mailing date Aug. 24, 2012, pp. 1-4, publisher United States Patent and Trademark Office, Alexandria, Virginia, USA; parent U.S. Appl. No. 13/288,065 (4 pages).
United States Patent and Trademark Office; Office Action; Office Action from U.S. Appl. No. 13/288,065; copyright and mailing date Nov. 28, 2012, pp. 1-11, publisher United States Patent and Trademark Office, Alexandria, Virginia, USA; parent U.S. Appl. No. 13/288,065 (11 pages).
United States Patent and Trademark Office; Office Action; Office Action from U.S. Appl. No. 13/288,065; copyright and mailing date Apr. 16, 2013, pp. 1-9, publisher United States Patent and Trademark Office, Alexandria, Virginia, USA; parent U.S. Appl. No. 13/288,065 (9 pages).
United States Department of Homeland Security; Petition for Inter Partes Review of U.S. Pat. No. Re. 43,990 Under 35 U.S.C. §312 and 37 C.F.R. §42.104; Case IP2014-00714 for U.S. Pat. No. Re. 43,990; Filed Apr. 30, 2014; Washington, D.C., USA; pp. 1-57; (57 pages).
United States Department of Homeland Security; Declaration of Dr. Sriram Vishwanath; Case IPR2014-00714 for U.S. Pat No. Re. 43,990; Filed Apr. 30, 2014; Washington, D.C., USA; pp. 1-44; (44 pages).
Richard R Brooks and S.S. Iyengar; Multi-Sensor Fusion Fundamentals and Applications with Software; pubished 1998; Copyright Prentice Hall PTR; Upper Saddle River, New Jersey, USA; pp. 1-20; (20 pages).
Ramanarayanan Viswanathan and Pramod K Varshney; Distributed Detection with Multiple Sensors; Part 1—Fundamentals; Proceedings of the IEEE; Jan. 1, 1997; pp. 1-11; vol. 85; No. 1; Southern Illinois University Carbondale OpenSIUC; Illinois, USA; pp. 1-11; (11 pages).
Blum; Distributed with Multiple Sensors: Part II—Advanced Topics; Proceedings of the IEEE; Jan. 1, 1997; pp. 1-16; vol. 85, No. 1; Southern Illinois University Carbondale Open SIUC; Illinois, USA, pp. 1-11; (16 pages).
Victor Lesser; Distributed Sensor Networks a Multiagent Perspective; 2003; pp. 1, 2, 5, 6, 22, 26, 27, 36, 275, 320; copyright 2003 Kluwer Academic Publishers: AH Dordrecht, The Netherlands; (10 pages).
Samuel Blackman and Robert Popoli; Design and Analysis of Modern Tracking Systems; 1999; pp. 1, 2, 6, 472; copyright 1999 Artech House; Norwood, Massachusetts, USA; (4 pages).
Jean-Francois Chamberland; Decentralized Detection in Sensor Networks; 2003; pp. 407-416; IEEE Transactions on SIgnal Processingl vol. 51, No. 2; Urbana, Illinois, USA; (10 pages).
Oleg Kachirski and Ratan Guha; Effective instrusion Detection Using Multiple Sensors in Wireless Ad Hoc Networks; pp. 1-8; Proceedings of the 36$^{th}$ Hawaii International Conference on System Sciences; copyright 2003; Orlando, Florida, USA; (8 pages).
Lawrence A Klein; Sensor and Data Fusion a Tool for Information Assessment and Decision Making; 2004; pp. 1-4, 6, 81, 87-89; copyright 2004 The Society of Photo-Optical Instrumentation Engineers; Publisher is SPIE—the International Society for Optical Engineering; Bellingham, Washington, USA; (12 pages).
Dale Ferriere and Khrystyna Pysareva and Andrezej Rucinski; Using Technology to Bridge Maritime Security Gaps; Aug. 1, 2005; Sea Technology; pp. 1-6; copyright Compass Publications, Inc. Jan. 2009; Portsmouth, New Hampshire, USA; (6 pages).
Corie Lok; Cargo Security; MIT Technology Review; Jun. 2004; No. 107; pp. 74-75; publisher is Massachusetts Institute of Technology; Cambridge, Massachusetts, USA; (2 pages).
Thomas C Chen; RFID and Sensor-based Container Content Visbility and Seaport Monitoring system; Proceedings of SPIE, vol. 5778; pp. 151-159; Mar. 28, 2005; Publisher is SPIE—the International Society for Optical Engineering; Bellingham, Washington, USA; (10 pages).
United States Department of Homeland Security; The University of Texas at Austin College of Engineering Standard Resume of Sriram Vishwanath; Case IPR2014-00714 for U.S. Pat. No. Re. 43,990; Filed Apr. 30, 2014; Washington, D.C., USA; pp. 1-21; (21 pages).

* cited by examiner

MULTI SENSOR DETECTION, STALL TO STOP AND LOCK DISABLING SYSTEM

This application is a continuation application and claims the filing date and benefit of U.S. patent application Ser. No. 13/288,065 titled "Multi Sensor Detection, Stall to Stop and Lock Disabling System" filed on Nov. 3, 2011 and that will issue on Sep. 10, 2013 as U.S. Pat. No. 8,531,280, the entire contents of which are incorporated by reference herein in their entirety for all purposes. U.S. patent application Ser. No. 13/288,065 that will issue as U.S. Pat. No. 8,531,280 is a divisional application and claims the filing date and benefit of U.S. patent application Ser. No. 12/802,001 titled "Multi Sensor Detection, Stall to Stop, and Lock Disabling System" filed on May 27, 2010, now U.S. Pat. No. 8,334,761, the entire contents and complete subject matter of which is are incorporated by reference herein in their entirety for all purposes. U.S. patent application Ser. No. 12/802,001 is a continuation application and claims the filing date and benefit of U.S. patent application Ser. No. 12/657,356 titled "Multi Sensor Detection, Stall to Stop and Lock Disabling System" filed on Jan. 20, 2010, now U.S. Pat. No. 8,106,752 and incorporates the entire contents and complete subject matter therein by reference in their entirety for all purposes. U.S. patent application Ser. No. 13/288,065 that will issues as U.S. Pat. No. 8,531,280 also claims the filing date and benefit of and incorporates the entire contents of U.S. patent application Ser. No. 12/657,356, now U.S. Pat. No. 8,106,752 herein by reference for all purposes. The present application also claims the filing date and benefit of and incorporates the entire contents of U.S. patent application Ser. No. 12/802,001, now U.S. Pat. No. 8,334,761 by reference herein for all purposes. The present application also claims the filing date and benefit of and incorporates the entire contents of U.S. patent application Ser. No. 12/657,356, now U.S. Pat. No. 8,106,752 herein by reference for all purposes.

FIELD OF THE INVENTION

The present invention pertains to anti-terrorist detection and prevention systems, and more particularly pertains to a disabling lock mechanism combined with a chemical/biological/radiological detection system for use with products grouped together by similar characteristics in order to prevent unauthorized entry, contamination and terrorist activity.

BACKGROUND OF THE INVENTION

Terrorist activity is a continuous, daily, worldwide threat to the stability, prosperity, security and peace within nations and between and among nations. Its danger lies in its arbitrary destructiveness as much as in its unpredictability, and the constant threat of terrorist activity compels measures and actions that cause strain and contention in free, democratic societies as security concerns and civil liberty concerns must be balanced so that both public safety and civil liberties are maintained. Safety and security concerns can be addressed through numerous proactive steps and measures, many of which cause only minimal interference with and disruption of the daily routines of work, travel, commerce and entertainment. However, because modern industrial societies afford almost limitless places, locations, and opportunities for terrorist activities, no safety measure or security protocol will be foolproof, but many security measures, systems and protocols can be implemented that greatly minimize specific threats through fingerprint identification procedures, chemical, biological, and radiological hazard detections, bomb and explosive detection, and controlling the access to everything from shipping containers to school lockers. Thus, the prior art discloses a wide range of security measures and systems.

For example, the Fishbine et al. patent (U.S. Pat. No. 4,792,226) discloses an optical fingerprinting system that includes an optics/processor unit, a video monitor, a data terminal, and a printer for collecting and storing data characteristics of all ten individual fingerprints for printing demographic information and fingerprint images as desired on a standard booking or applicant card.

The Schiller patent (U.S. Pat. No. 4,544,267) discloses a finger identification unit that includes a fingerprint scanning apparatus using a collimated beam of light to interrogate the fingerprint of a finger placed against a platen so that successive scan positions produce signals containing fingerprint information.

The Fishbine et al. patent (U.S. Pat. No. 5,222,152) discloses a portable fingerprint scanning apparatus for optically scanning and recording fingerprint images and wirelessly transmitting such images to a mobile processing unit for verification and background checking.

The Lougheed et al. patent (U.S. Pat. No. 5,233,404) discloses an optical scanning apparatus that uses a linear charge coupled device (CCD) for recording the image of a fingerprint on the viewing surface.

The Groger et al. patent (U.S. Pat. No. 5,766,956) discloses a diode laser based sensor for undertaking optical, chemical, immunological or nucleic acid-based assay or other chemical analysis.

The Feldman patent (U.S. Pat. No. 5,938,706) discloses a multi element security system for preventing the unauthorized use of an automotive vehicle, and which includes numerous locking and control features interconnected to an onboard cpu.

The Bowker et al. patent (U.S. Pat. No. 5,963,657) discloses a safety access control for doors, handles, locks, etc., wherein the surface relief of a finger is read and verified to either allow or prevent access by the individual to the door, handle, lock, etc.

The Bonder et al. patent (U.S. Pat. No. 6,078,265) discloses a fingerprint identification security system wherein a key lock operated security system utilizes the fingerprint of the individual to control user access to the security system, such as the ignition system of an automotive vehicle.

The Anzai et al. patent (U.S. Pat. No. 6,271,745 B1) discloses a keyless authorization system for use of a motor vehicle that includes fingerprint reading units located on the exterior or interior of the motor vehicle and which is coupled to a control unit for scanning, comparing and matching fingerprints to allow or disallow access to the motor vehicle.

The Hwang patent (U.S. Pat. No. 6,374,652 B1) discloses a fingerprint-activated doorknob in which a detecting sensor for a fingerprint is placed on the doorknob for measuring and searching the fingerprint against previously stored fingerprint inputs to control access to the door.

The Vor Keller et al. patent (U.S. Pat. No. 6,588,635 B2) discloses a safety holster for a firearm that includes a pivotally mounted retaining member and a fingerprint sensor for scanning fingerprint information so that only authorized users can withdraw the firearm from the holster.

The Cordery et al. patent (U.S. Pat. No. 6,613,571 B2) discloses a method and system for detecting biological and chemical hazards in the mail that includes sensors placed within the mail box for sampling and testing ambient air and so that mail can be safely transported through the mail system.

The Nagata patent (U.S. Pat. No. 6,628,213 B2) discloses a coding method for digital signal coding and decoding that includes a CMI (code-marked inversion) method of signal coding.

Nonetheless, despite the ingenuity of the above devices, methods, and systems, there remains a need for a multi-detector and disabling lock system for use with various types of products collected together by common characteristics into product groupings for detecting chemical, biological and radiological agents and compounds and for selectively disabling and activating the product locks thereby preventing unauthorized entry and further contamination and preventing and thwarting terrorist activities.

SUMMARY OF THE INVENTION

The present invention comprehends a chemical/biological/radiological detector unit with a disabling locking system for protecting products that can be grouped into several product groupings, from terrorist activity, and also for preventing unauthorized access to and tampering with the storage and transport of ordnance and weapons. The products grouped into what may be referred to as Product grouping 1 include, but are not limited to, cargo containers, shipping containers, tractor trailers, mail carriers, mail boxes and lockers; while the products grouped into what may be referred to as Product grouping 2 include, but are not limited to, chemical, biological, radiological, and nuclear detectors, motion sensors and door sensors. The multi sensor detection system includes the capability to disable an existing lock or activate a lock located inside any of the products named in the product grouping categories upon activation of a sensor or detector included in the system. This is a significant feature for the multi sensor detection system as it prevents unauthorized, unequipped and untrained entry and access to the product thus preventing further contamination of the site and to individuals in the area.

The multi sensor detection and lock disabling system includes a detector case sized to fit in, upon or adjacent any of the aforedescribed products for detecting harmful and dangerous chemical, biological, and radiological agents, compounds and elements. In addition, the multi sensor detection and lock disabling system is capable of transmitting a signal to lock or disable a lock on the product, and is also capable of transmitting signals to a monitoring computer terminal or PC so that appropriate defensive and safeguarding actions can be undertaken and an authorized individual can disarm and reset the locking system and the multi sensor detection system. The detector case includes a power source (battery or electrical), interior compartments, Internet and GPS connections and a cpu interconnected with the Internet and GPS connections, and also interconnected with one or more off site monitoring computer terminals or PCs. The detector case includes one or more light alarm indicators that are externally visible and that light up when the chemical, biological, or radiological agent or compound is detected, and the light alarm indicators (which can be indicator lights or panels on the front of the detector case) can be color coded for denoting the specific agent or compound detected, i.e., separate and distinct colors for indicating detection of the chemical, biological, or radiological agent or compound.

The detector case is designed to hold within the interior compartments one or more interchangeable detectors, and each detector is adapted and set up to sample a specific compound or agent. Each detector includes a sound alarm, a sensor, a light alarm, and a readings panel, and is electrically interconnected (either by wire or wirelessly) to the cpu of the detector case so that information regarding the detection of the particular agent or compound can be conveyed from the detectors to the detector case cpu. Each detector can also be used as a manual, stand-alone hand held scanner.

The multi sensor detection and lock disabling system can be interconnected to a surveillance watchtower, as well as monitoring computer terminals or PCs, with the watchtower scanning shipping and cargo crates and containers being prepared for shipment or sitting for extended periods of time on a dock or at a port, at a railway site, or at an industrial storage facility. The watchtower will scan the cargo and shipping crates and containers for the light alarm indicators on detector cases that are mounted in or upon the crates and containers, and thus continuous security surveillance of the crates and containers can be maintained.

An enhanced version of the multi sensor detection and lock disabling system can be employed to prevent car and vehicle bombings. Coupling the multi sensor detection and lock disabling system with satellite service will enable the detection system to detect explosives and transmit an alert signal by satellite to monitoring equipment at a monitoring site. Upon receiving the alert signal at the monitoring site the monitoring equipment activates a stall-to-stop process for disabling the air, fuel, electrical and/or computer system of the vehicle. Moreover, upon receiving the alert signal at the monitoring site the car or vehicle will be locked by transmission of a satellite signal that disables the vehicle's electrical and ignition system thereby preventing escape of the terrorist.

It is an objective of the present invention to provide a multi sensor detection and disabling lock system for securing news racks and vending machines in order to prevent theft, unauthorized use and terrorist activity.

It is another objective of the present invention to provide a multi sensor detection and disabling lock system for preventing terrorist activity by using products grouped together by common features in several product groupings such as design similarity, similarity in the presentation of security problems and similarity with regard to the presentation of solutions to preventing terrorist solutions.

It is still yet another objective of the present invention to provide a multi sensor detection and disabling lock system that is capable of disabling an existing lock or activating a lock inside any of the products of the product grouping lists when a detector or sensor of the system is activated.

It is still yet a further objective of the present invention to provide a multi sensor detection and disabling lock system wherein the disabling lock system prevents the unauthorized entry, access and further contamination of the products included in the several product groupings.

A still further objective of the present invention is to provide a multi sensor detection and lock disabling system that utilizes a multi-task device for preventing terrorist activity to vulnerable products that are collected or arranged by product grouping categories.

Yet a further objective of the present invention is to provide a multi sensor detection and disabling lock system to secure cargos and containers, especially cargo and shipping containers, against chemical, biological, radiological and nuclear terrorist activity.

Still another objective of the present invention is to provide a multi sensor detection and disabling lock system capable of detecting chemical, biological and radiological agents and compounds.

Still yet another objective of the present invention is to provide a multi sensor detection and disabling lock system that includes interchangeable detectors that operate in conjunction to detect chemical, biological and radiological agents and compounds.

Still yet a further objective of the present invention is to provide a multi sensor detection and disabling lock system that can be implemented by business or government at a minimum cost by organizing the products to be protected into product grouping categories.

Another objective of the present invention is to provide a multi sensor detection and disabling lock system that accurately and reliably detects harmful agents, compounds and elements, and prevents the placement and storage of weapons and bombs in the range of storage containers and facilities currently available.

Still another objective of the present invention is to provide a multi sensor detection and disabling lock system wherein the interchangeable detectors that comprise part of the system can be used as stand-alone scanners.

These and other objects, features, and advantages will become apparent to those skilled in the art upon a perusal of the following detailed description read in conjunction with the accompanying drawing figures and appended claims.

DETAILED DESCRIPTION OF THE PREFERRED EMBODIMENT

Illustrated in FIGS. 1-19 is a multi sensor detection and lock disabling system 10 for preventing terrorist activity by monitoring, detecting, and securing those critical areas, sites, and facilities vulnerable to terrorist activity. The first step is the identification of critical areas, sites, locations and facilities that are vulnerable to terrorist activity as convenient places to store and plant explosives and bombs and spread biological, chemical or radiological agents and compounds, followed by the disposition of the multi sensor detection and lock disabling system 10 for monitoring, detecting, and securing the particular location or site. Vulnerable sites, locations, facilities and areas are nearly limitless in their variety; in order to categorize the protection the present invention provides an anti-terrorist product grouping strategy has been developed wherein products made from the same or similar material, products having the same or similar design, and products presenting the same or similar security problems are grouped together with the multi sensor detection and lock disabling system 10 for preventing terrorist activity. For example, two preferred product groupings can be Product Grouping I: cargo containers, shipping containers, cargo planes, freight train cars, tractor trailers, mail carriers (UPS, FedEx), airport lockers, news racks (coin and non-coin operated), mail drop boxes, cluster mail boxes, keyed mail boxes, min-storage houses and buildings, bicycle lockers, stadium lockers, school lockers, cars, trucks, campers, buses, vans and utility vehicles. Product Grouping II: chemical detectors, biological detectors, radiological detectors, nuclear detectors, motion sensors, glass break sensors, plastic film on glass, high security locks, tampering labels, door sensors, disabling locking systems, vehicle detectors and satellite disabling locking systems. In addition to grouping products together by features, designs and materials, the multi sensor detection system 10 includes a lock disabling capability for disabling an existing lock or activating a lock on or inside any of the aforementioned products when a detector or sensor of the system is activated. The lock disabling feature is a crucial component of the invention in so far as it prevents unauthorized, unequipped or untrained individuals from gaining access and entry to the site and causing further contamination of the site.

Figure 3A:
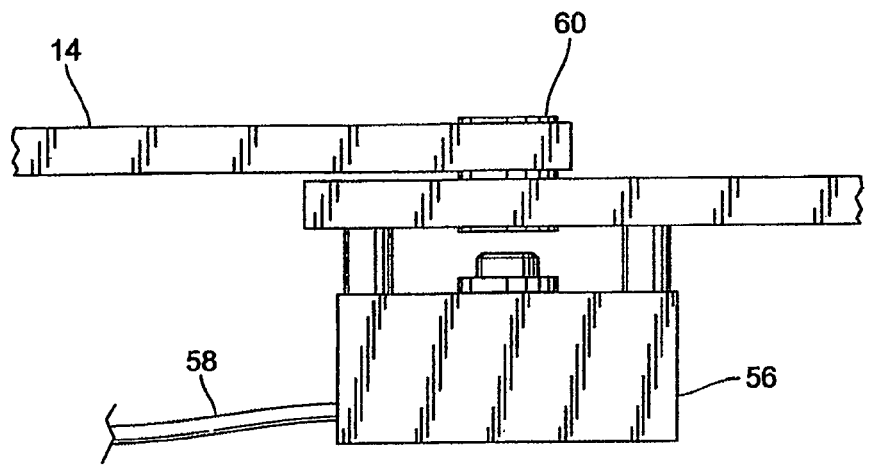
FIG. 3a is a top plan view of the multi sensor detection and lock disabling system of the present invention illustrating the mounting of one lock disabler to the lock of a product, such as a container, and disengaged from the lock of the container.
Figure 3B:
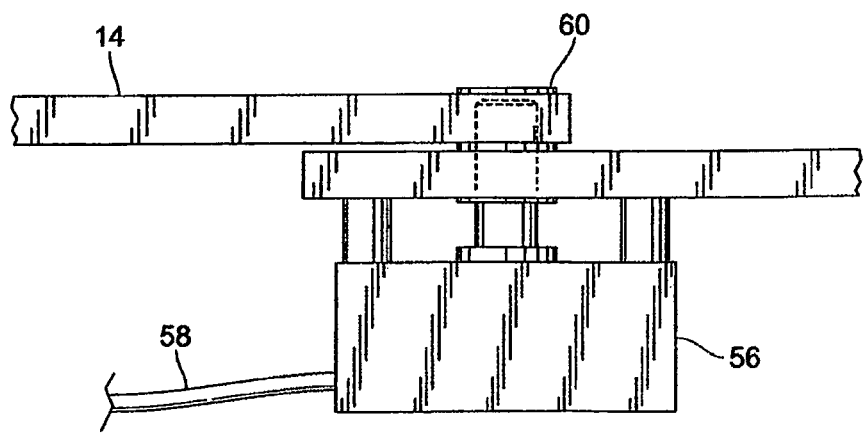
FIG. 3b is a top plan view of the multi sensor detection and lock disabling system of the present invention illustrating the engagement of the lock disabler to the lock of the product for locking or disabling the lock of the product so that unauthorized access is prevented.
Figure 4:
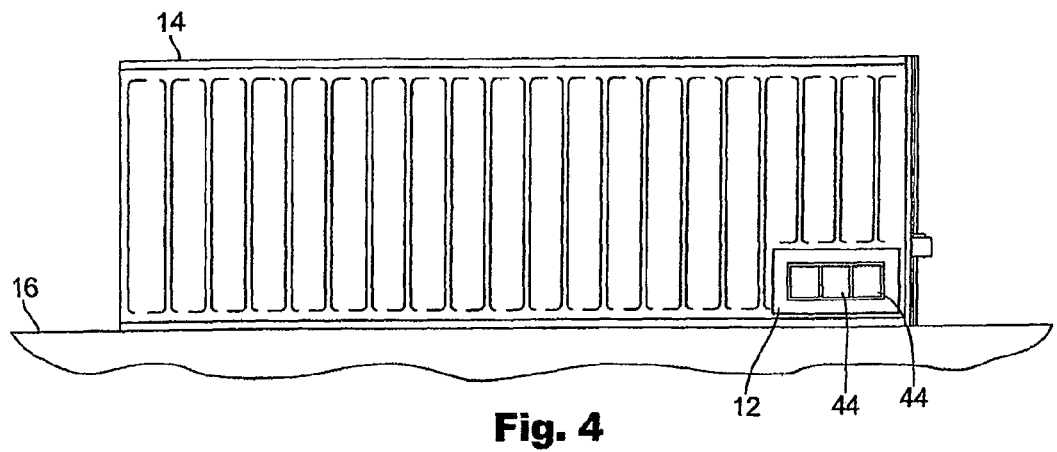
FIG. 4 is a side elevation view of the multi sensor detection and lock disabling system of the present invention illustrating the detector case mounted to the product, such as the container, with the light alarm indicators externally visible.
Figure 5:
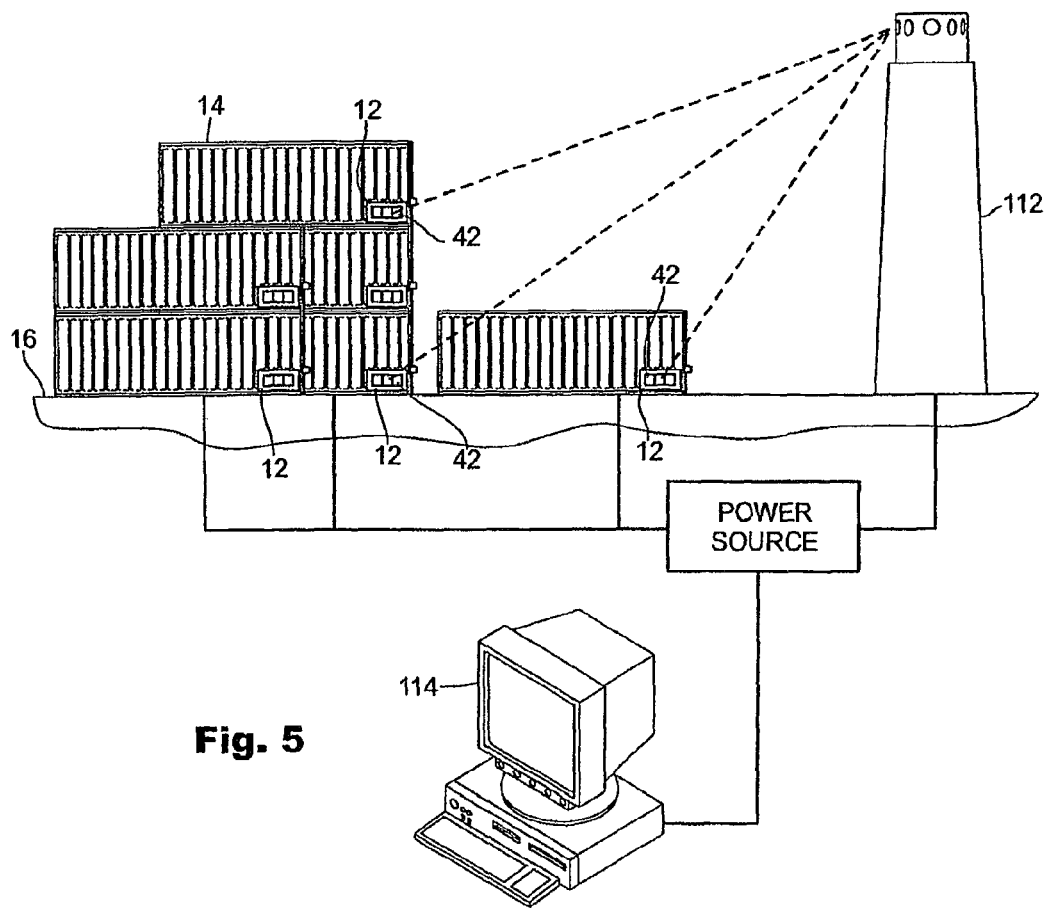
FIG. 5 is a schematic view of the multi sensor detection and lock disabling system of the present invention illustrating the interconnection of detector cases with a surveillance watchtower and a monitoring PC terminal.
Figure 6:
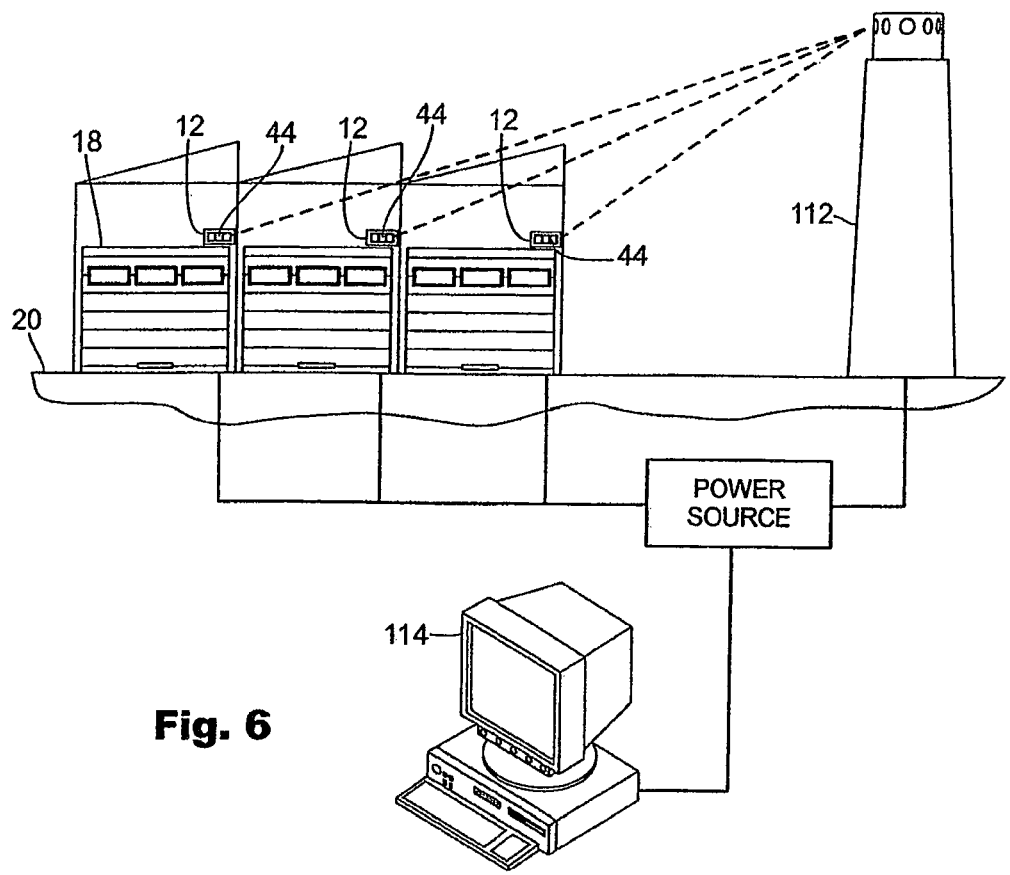
FIG. 6 is a schematic view of the multi sensor detection and lock disabling system of the present invention illustrating the placement of detector cases upon containers different from the containers of FIG. 5, and wherein the detectors case are interconnected to a surveillance watchtower and a monitoring PC terminal.
Figure 7:
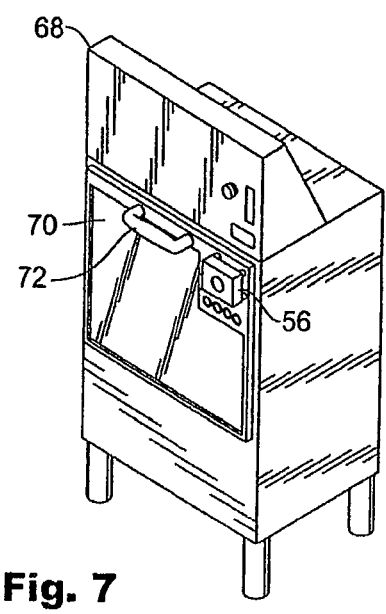
FIG. 7 is a perspective view of the multi sensor detection and lock disabling system of the present invention illustrating the mounting of one automatic/mechanical lock disabler to the lock of a standalone news rack.
Figure 8:
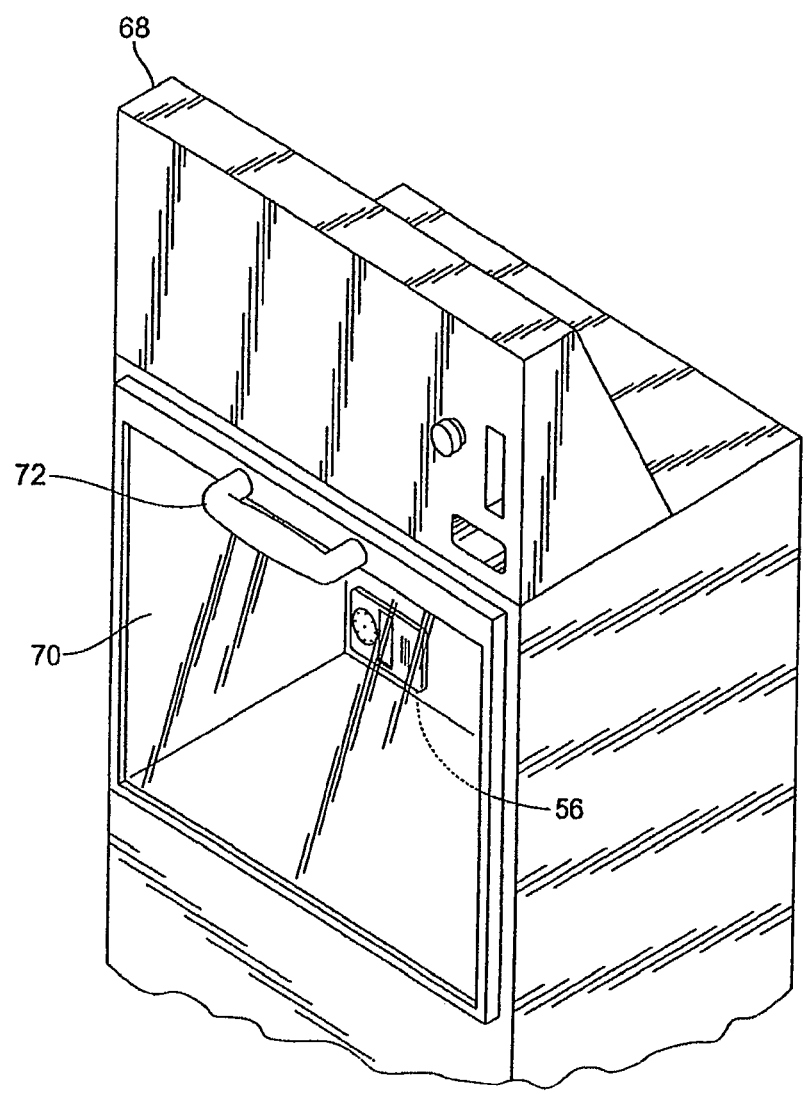
FIG. 8 is a perspective view of the multi sensor detection and lock disabling system of the present invention illustrating one interchangeable detector placed within the standalone news rack.
Figure 9:
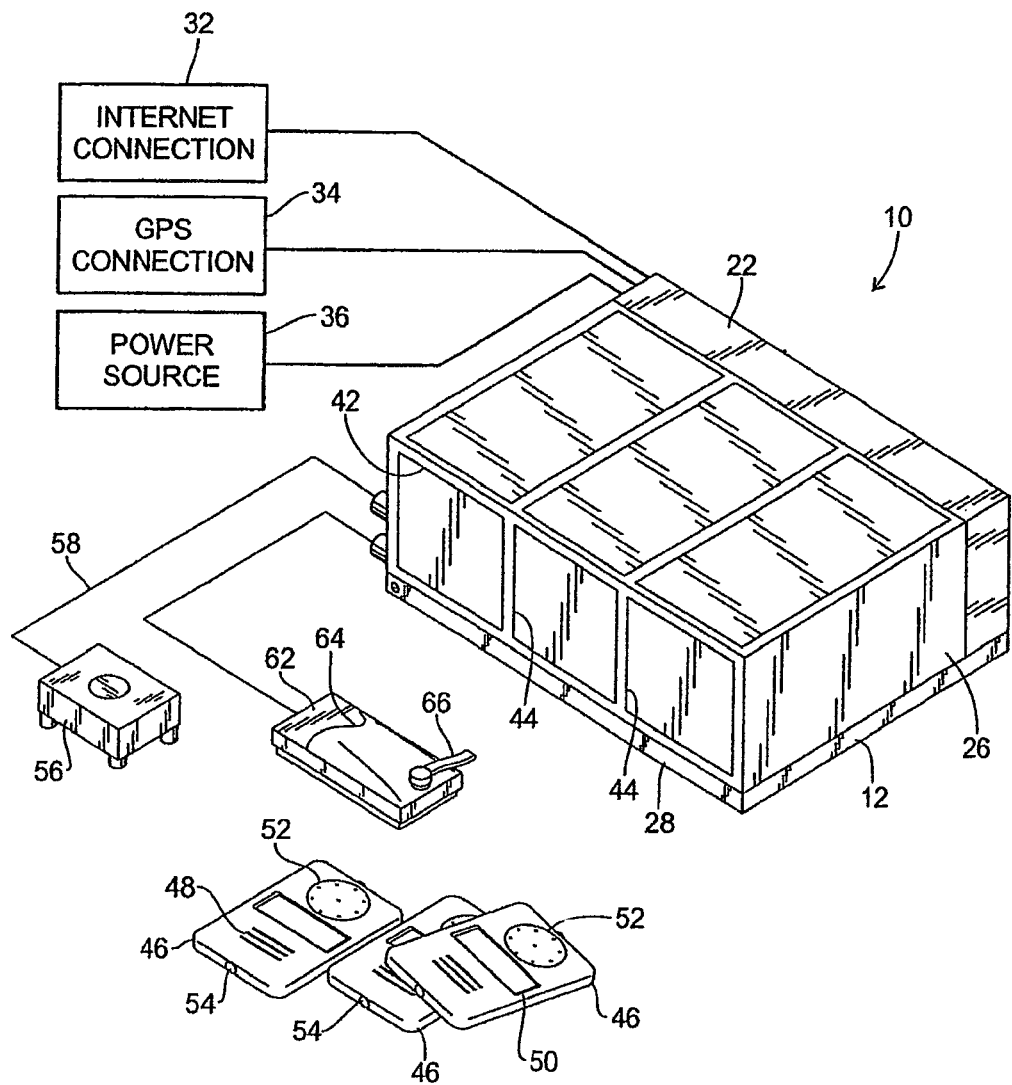
FIG. 9 is a perspective view of the multi sensor detection and lock disabling system of the present invention illustrating the detector case having color coded front panels for specifically indicating the agents, compounds or elements that have been detected.
Figure 10:
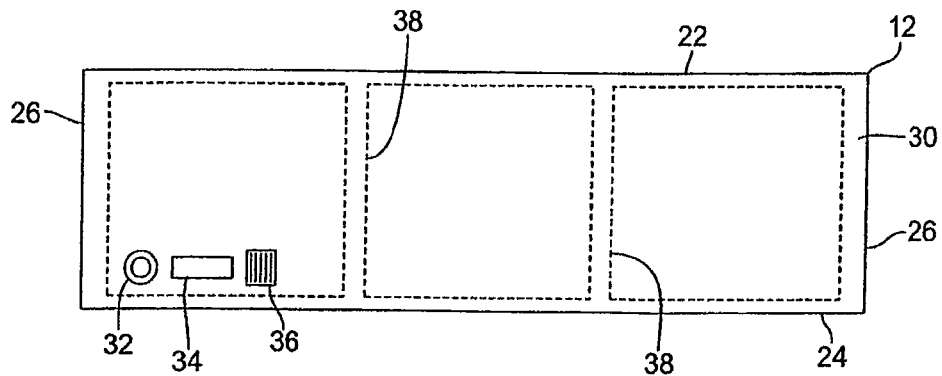
FIG. 10 is a rear elevation view of the multi sensor detection and lock disabling system of the present invention illustrating the GPS, Internet and power source connections.

As shown in FIGS. 1-10, the multi sensor detection and lock disabling system 10 includes at least one—and preferably many—detector case 12 that can be placed in, on, upon or adjacent the product, such as the shipping containers 14 of FIGS. 4 and 5 resting upon a platform 16 or the cargo container 18 of FIG. 6 sitting upon a seaport dock or pier 20. The detector case 12 includes a top 22, a bottom 24, a pair of opposed sides 26 and a front side or panel 28 and an opposite rear or back side 30. The rear side 30 has connections or contacts that can include an Internet connection 32, a GPS connection 34 and a power connection 36 for a power source. The power source for the detector system 10 can be any conventional battery or electrical source. The detector case 12 includes an interior chamber divided into a number of compartments 38 for holding therein agent or compound detection means hereinafter further described. A cpu 40 is mounted within the detector case 12 and electrically interconnects, routes, and transmits signals among items hereinafter further described and also communicates with a monitoring site and monitoring equipment. The front side 28 of the detector case 12 includes indicator means for visually indicating that a specific agent, compound or element has been detected. The indicator means can include color coded indicator lights 42 in panel form, as shown in FIG. 9, with each indicator light panel 42 lighting up with a specific color corresponding to the detection of a specific agent or compound; or color coded indicator lights 44, as shown FIG. 1, that correspond to and individually light up on the detection of a specific agent or compound (chemical, biological, or radiological).

Figure 1:
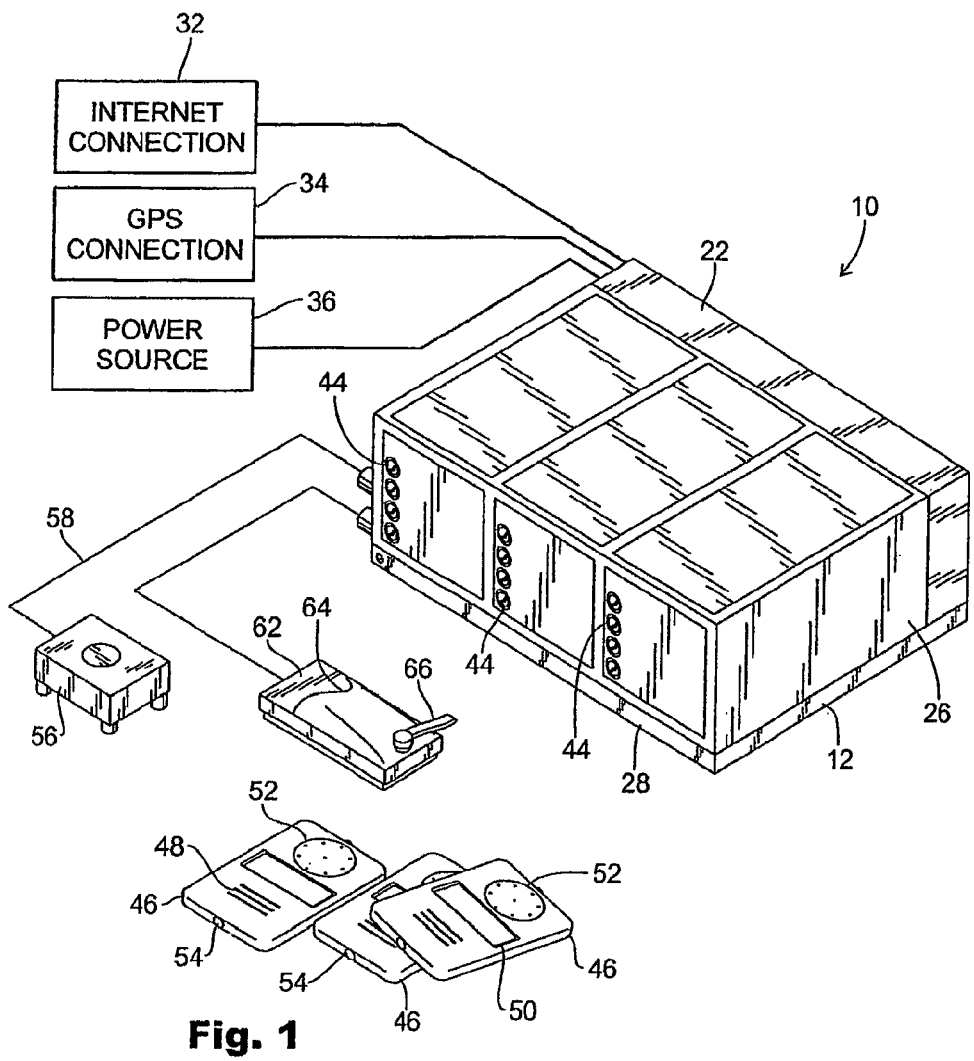
FIG. 1 is a perspective view of the multi sensor detection and lock disabling system of the present invention illustrating the primary features of the system which include a detector case, several interchangeable detectors, an automatic/mechanical lock disabler and a fingerprint biometric lock with disabler.
Figure 2:
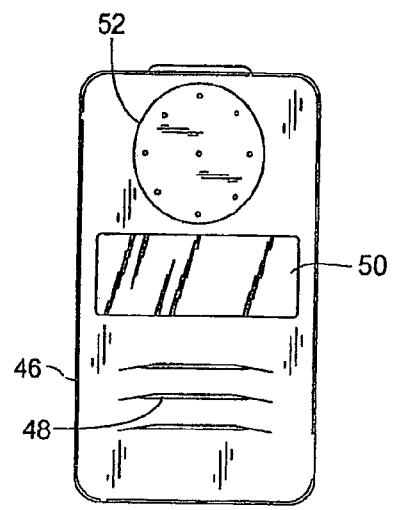
FIG. 2 is a front elevation view of the multi sensor detection and lock disabling system of the present invention illustrating one of the interchangeable detectors first shown in FIG. 1.

As shown in FIGS. 1, 2 and 9-13, the multi sensor detection and lock disabling system 10 includes a plurality of detectors 46 with each detector 46 adapted for and set up to sample for a specific agent or compound (biological, chemical, or radiological); and the detectors 46 are interchangeable for adapting to the needs and demands of future technology. The detectors 46 can also be used as standalone scanners. In the preferred embodiment of the invention, at least three detectors 46 are placed within the detector case 12 with one detector 46 for specifically sampling biological agents or compounds, one detector 46 for sampling chemical agents or compounds, and one detector 46 for sampling radiological agents or compounds. The detectors 46 are interconnected to the cpu 40 of the detection system 10 by conventional connections that can be wire or wireless for transmitting the appropriate signals to the cpu 40 upon detection of the particular agent or compound. As shown in FIG. 2, each detector 46 includes on its front plate or facing surface a sound alarm indicator 48, a readings panel 50 comprising a plastic shield and LED lights for displaying the various read-out messages, a sensor 52 for detecting the specific agent, element or compound, and a light alarm indicator 54 that can be color coded for each specific agent and which is externally visible when the detector 46 is used as a stand alone scanner. Each detector 46 includes a conventional microprocessor for controlling the various functions and generating the appropriate signals for transmission to the cpu 40 of the detector case 12.

As shown in FIGS. 1, 3a, 3b, 9, and 13-15, used in conjunction with the multi sensor detection and lock disabling system 10 is at least one automatic/mechanical lock disabler 56—and depending upon the number of products being monitored there can be one lock disabler 56 for each product. The automatic/mechanical lock disabler 56 is physically connected to the detector case 12 by a wire or cable 58 for receiving signals therefrom for disabling an existing lock or activating a lock inside a product to prevent access to the product. By way of example, FIG. 3a shows the automatic/mechanical lock disabler 56 mounted—by any conventional means—to the lock 60 of the shipping container 14 shown in FIGS. 4 and 5 and connected by wire 58 to the cpu 40 of the detector case 12. The lock disabler 56 is in the non-activated or disengaged state in FIG. 3a. FIG. 3b shows the automatic/mechanical lock disabler 56 mounted to the lock 60 of the shipping container 14 and in the activated or engaged state after detection of an agent or compound by the system 10 thereby for locking or disabling the lock 60 of the shipping container 14 and preventing unauthorized entry and access by unauthorized, untrained and unequipped individuals. In FIGS. 3a and 3b the lock 60 secures doors of the shipping container 14 that can be slidably or pivotably opened and closed.

Figure 14:
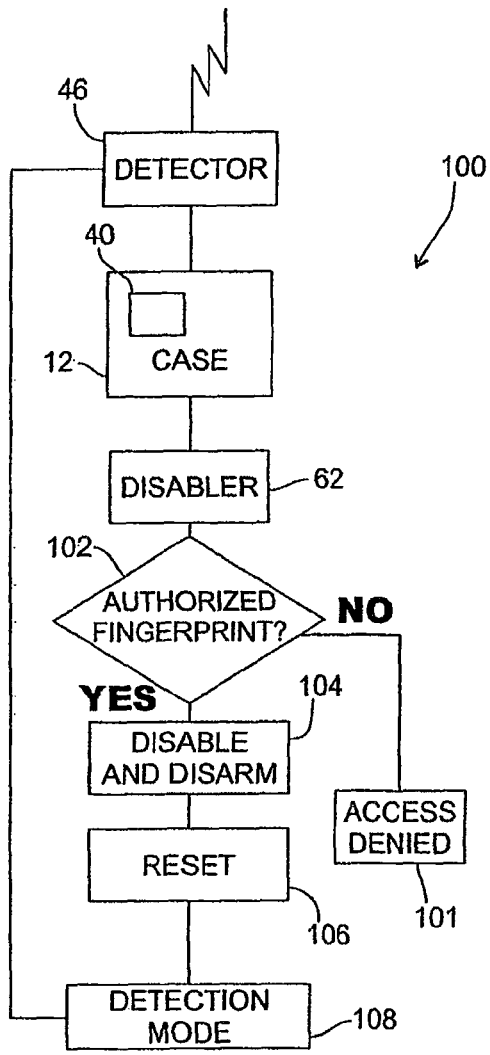
FIG. 14 is a representative schematic view of the multi sensor detection and lock disabling system of the present invention illustrating interconnection of the detector case with the fingerprint biometric lock with disabler for engaging and disengaging the fingerprint biometric lock as part of the process of detection and safeguarding the public upon detection of the agent or compound.

In addition to the automatic/mechanical lock disabler 56, the multi sensor detection and lock disabling system 10 can also utilize a fingerprint biometric lock with disabler 62 as shown in FIGS. 1 and 14. The fingerprint biometric lock with disabler 62 is interconnected to the cpu 40 of the detector case 12 for receiving transmissions therefrom after detection of an agent or compound has occurred so that the lock on the product can be locked or disabled. Moreover, resetting of the fingerprint biometric lock with disabler 62 occurs when the fingerprint of the individual is placed on the fingerprint-matching pad 64, and if a match occurs with a known fingerprint stored by the cpu 40, then the individual can reset the fingerprint biometric lock with disabler 56 by turning the manual lock disabler 66. The fingerprint biometric lock with disabler 62 is mounted to the lock of the product in a manner similar to the mounting of the automatic/mechanical lock disabler 56 that is shown in FIGS. 3 and 3b.

FIGS. 4 and 5 show one manner of disposition or placement of the detector case 12 in relation to the product, i.e., the shipping container 14, with the color coded indicator lights 42 externally viewable; FIG. 5 shows a number of shipping containers 14 each equipped with a detector case 12 and integrated with elements hereinafter further described for continuously monitoring the shipping containers 14 as they sit for an extended period of time on the truck or rail platform 16. FIG. 6 illustrates several cargo containers 18 sitting on the shipping dock or pier 20, with each cargo container 18 having a detector case 12 mounted thereon and integrated with and monitored by elements shown in FIG. 5 and hereinafter further described.

FIG. 7 illustrates a typical product from product grouping 1 that is monitored by the multi sensor detection and lock disabling system 10 of the present invention; specifically, FIG. 7 shows a news rack 68 with one automatic/mechanical lock disabler 56 mounted to and interconnected with the locking mechanism of the news rack 68. As long as there is no detection of any agent or compound, the lock disabler 56 is in the disengaged state, and the individual can deposit the coin amount in the chute and then freely open the glass panel 70 by the handle 72 for removing a paper. However, the lock disabler 56 would be activated upon detection of the harmful agent or compound and receipt of a signal from the cpu 40 for locking or disabling the locking mechanism thereby denying access to the interior of the news rack 68 from all untrained, unauthorized and unequipped individuals.

FIG. 8 illustrates one detector 46 disposed within the news rack 68 and which is visible through the panel 70 for detecting one specific agent, compound or element. The detector 46 functions as a stand-alone scanner and can be wirelessly interconnected to offsite monitoring equipment.

Figure 11:
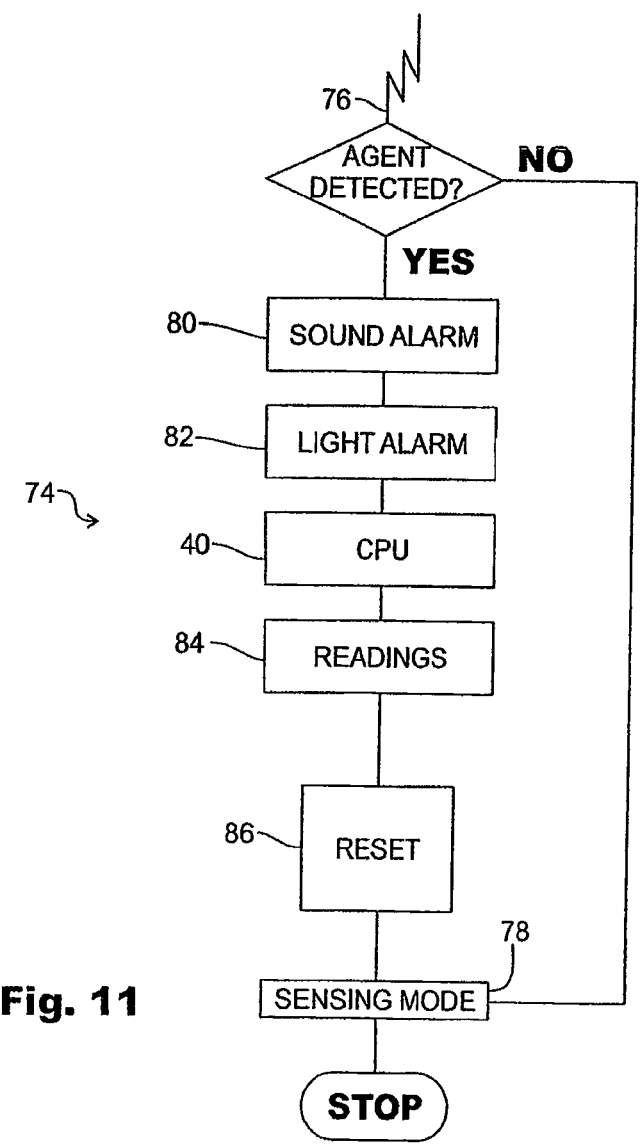
FIG. 11 is a representative schematic view of the multi sensor detection and lock disabling system of the present invention illustrating the interconnection of the detector with the detector case and the steps undertaken by the system when an agent or compound is detected.

FIG. 11 illustrates a representative schematic 74 for describing the signal transmission process from the detector 46 to the cpu 40 of the detector case 12. The external stimulus 76 would be the chemical, biological or radiological agent or compound. If there is no detection of the agent or compound, the detector 46 will stay in the sensing mode 78. However, detection of the specific agent will trigger the sound alarm 80 and the light alarm 82, and instant transmittal of a signal to the cpu 40. The readings 84 can be stored by the cpu 40 for verification and future review and evaluation. After all the appropriate corrective and preventative measures have been undertaken by the trained and authorized personal, and the site has been cleansed of the contamination, authorized and equipped personal can then reset 86 the system 10.

Figure 12:
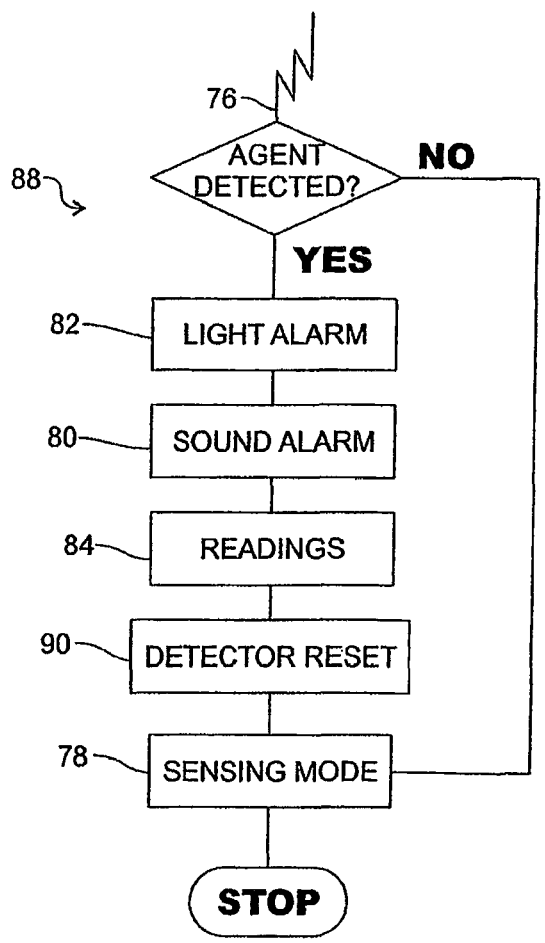
FIG. 12 is a representative schematic view of the multi sensor detection and lock disabling system of the present invention illustrating the sequence of steps undertaken by one detector when functioning as a standalone scanner for detecting an agent or compound.

FIG. 12 illustrates a representative schematic 88 for the detector 46 when used as stand-alone scanner. The detector 46 undergoes the same essential steps as illustrated in FIG. 11, with the exception of the signal transmission to the cpu 40. The detector 46 remains in detection mode 78 until an agent is detected, and then the various functions—light alarm 82, sound alarm 80, storage of readings 84, and, after the appropriate security and safety steps have been carried out by authorized personal, detector reset 90 by authorized personal can occur thereby placing the detector 46 back in detection or sensing mode 78.

Figure 13:
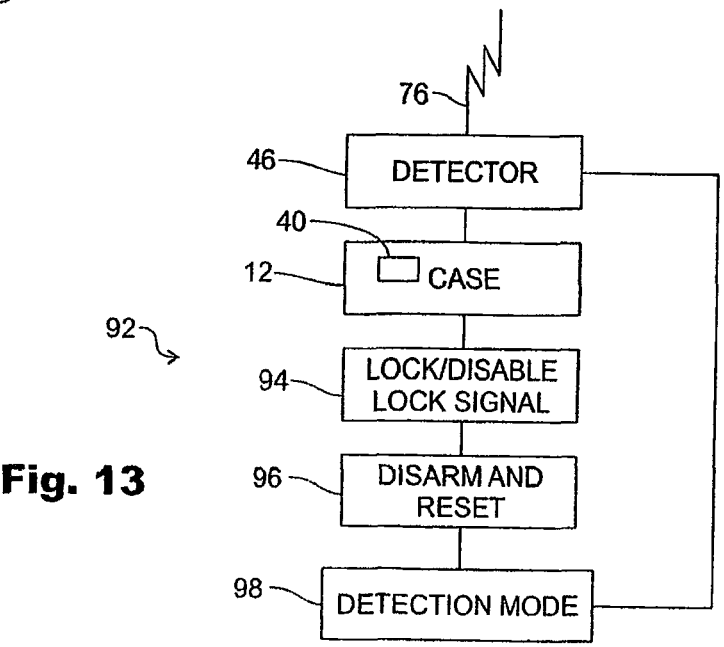
FIG. 13 is a representative schematic view of the multi sensor detection and lock disabling system of the present invention illustrating the interconnection of the detector case with the automatic/mechanical lock disabler for activating the lock disabler upon detection by the system of an agent or compound.

FIG. 13 is a representative schematic 92 that illustrates the steps undertaken by the system 10 to lock or disable a lock, such as the lock 60 for the shipping container 14 shown in FIGS. 3a and 3b. Upon detection of the agent (chemical, biological, radiological) the alarm light indicators 42 or 44 will light up providing external indication that an agent has been detected. In addition, the system 10—the cpu 40—will transmit a lock/disable lock signal 94 to the automatic/mechanical lock disabler 56 to lock or disable the lock on the product, such as the lock 60 on the shipping container 14 of FIGS. 3a-5. This prevents unauthorized, unequipped, or untrained individuals from entering or gaining access to the product for which a dangerous and perhaps lethal agent has been detected. After the proper authorities and authorized personal have been notified and all the appropriate security, preventative and clean up measures have been undertaken, the authorized individual can perform the disarm and reset function 96 for the system 10 placing the system 10 in back in the detection mode 98.

FIG. 14 is a representative schematic 100 illustrating the use of the fingerprint biometric lock with disabler 62 with the system 10. Upon detection of the agent or compound by the detector, the various alarms would sound and light up (shown in previous figures), and the cpu 40 would then transmit a signal to the fingerprint biometric lock with disabler 62 to lock or disable the lock on the product, such as the lock 60 on the shipping containers 14 shown in FIGS. 3a-5. The shipping containers 60 would remain locked and in an access denied mode 101 should an attempt be made to gain access to the container 60 by opening the lock 60 with an unauthorized fingerprint. However, a fingerprint that matches stored and authorized fingerprints 102 would indicate an authorized individual, and would allow the individual to disable and disarm 104 the lock 60 of the shipping container 14. The fingerprint biometric lock with disabler 62 would then be reset 106 after the appropriate safety, cleanup, and protection measures are completed, and the system 10 would be reset and placed back in the detection mode 108.

Figure 15:
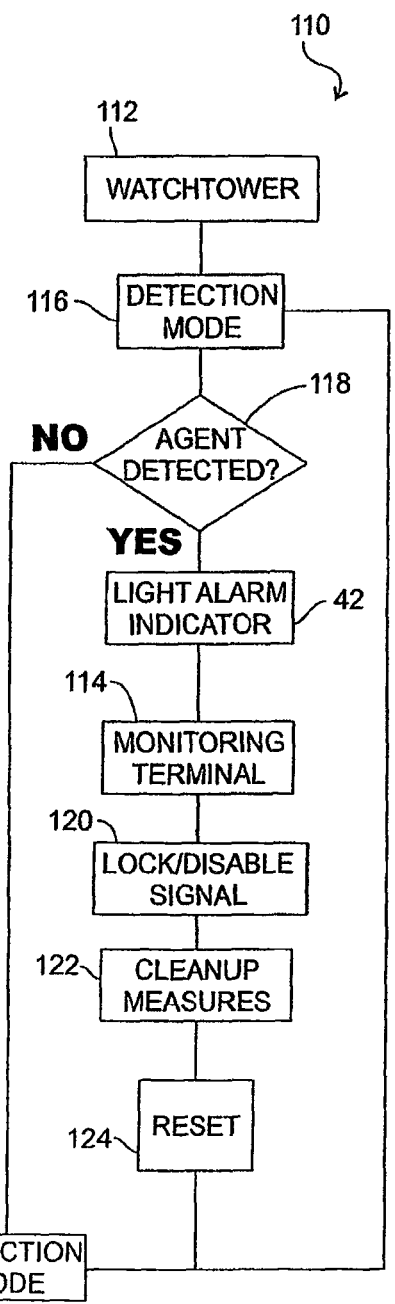
FIG. 15 is a representative schematic view of the multi sensor detection and lock disabling system of the present invention illustrating the incorporation of the system with a surveillance watchtower and a monitoring PC or computer terminal for monitoring containers, such as shipping or cargo containers, that may sit for extended time periods on docks, at rail yards, and at industrial storage facilities.

FIG. 15 is a schematic representation 110 that illustrates the integration of a surveillance watchtower 112 and a monitoring terminal or PC 114 for monitoring products such as the shipping containers 14 or cargo containers 16 that sit for extended periods of time of docks, piers 20, truck terminals, mil yards, shipping platforms 16 and industrial sites as shown in FIGS. 5 and 6. The watchtower 112 would maintain continuous surveillance over a number of shipping containers 60, for example, with detector cases 12 mounted in or on each container 14 and set in detection mode 116 with one or more detectors 46 disposed in each detector case 12. The watchtower 112 would continuously scan for light alarm indicators 42 and 44 on the products, such as the containers 14 or 18, and the watchtower 112 would be interconnected and integrated with the monitoring terminal or PC 114. Upon detection 118 of an agent or compound in one or more of the shipping containers 14, the appropriate light alarm indicators 42 or 44 would light providing visible confirmation of the detection of the specific agent or compound. The cpu 40 would transmit a lock/disable signal 120 to the lock 60 on each respective shipping container 14 to lock or disable the lock 60 thus preventing access to that respective shipping container 14. In addition, signal transmissions would be sent to the monitoring terminal or PC 114 (which could be off site) thereby alerting authorized security personal of the contamination event. With the information received at the monitoring terminal 114, authorized personal would then be notified and dispatched to the area to undertake the appropriate safety and cleanup measures 122. Such measures would also include disarming the lock disabling system in order to gain access to the shipping container 14. After all the cleanup and security measures are completed by the trained and properly equipped authorities, the detection system and the lock disabling feature would reset 124 and the detection system would again be placed in detection mode 116.

Figure 16:
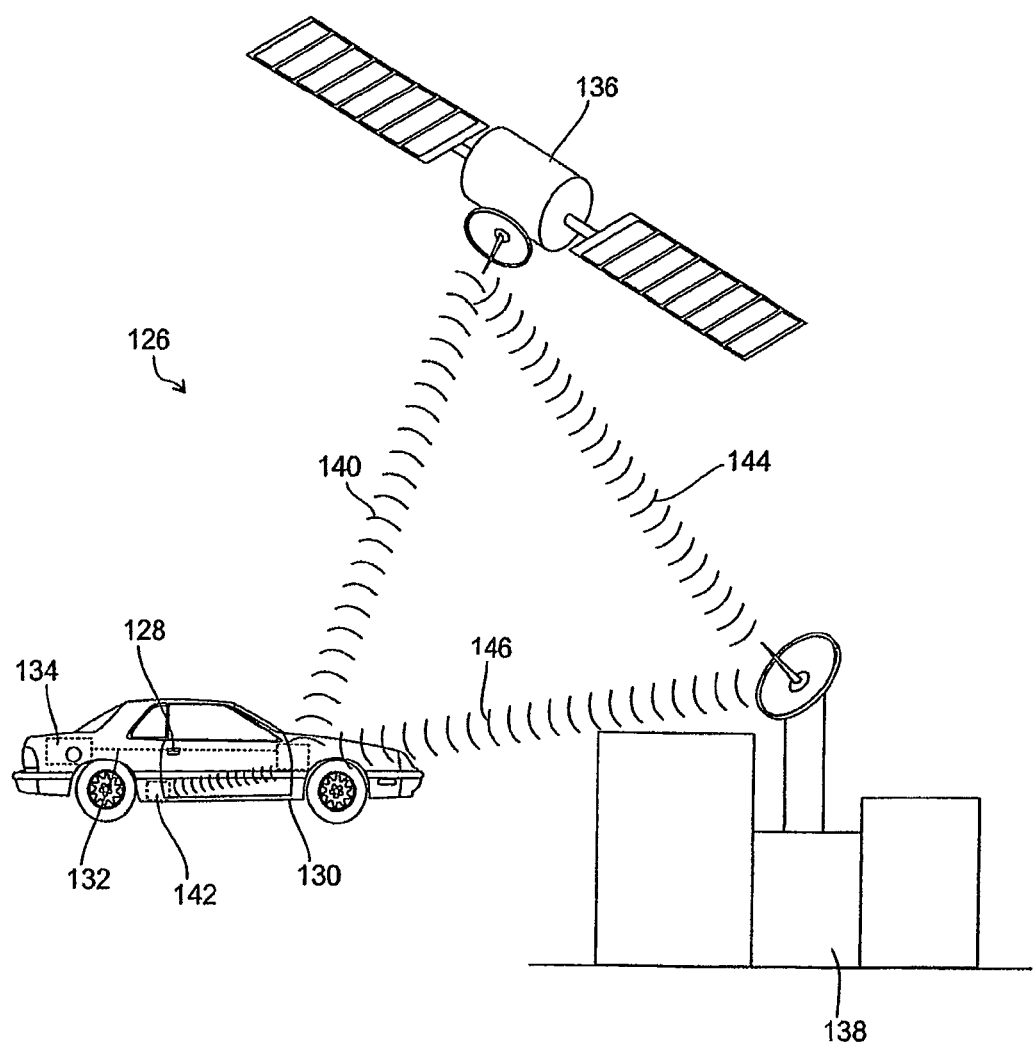
FIG. 16 is a representative schematic view of the multi sensor detection and lock disabling system of the present invention illustrating the integration of the detection system with a satellite and monitoring equipment at a monitoring site for detecting explosives placed in a vehicle and then transmitting signals to the satellite and then to the monitoring site for disabling and locking the vehicle.

FIG. 16 is a schematic representation 126 that illustrates an enhanced version of the multi sensor detection and lock disabling system 10 for preventing car and vehicle attacks and bombings. The lock disabling system 10 would be interconnected to the locking system and mechanism 128 of the vehicle 130. In addition, a stall to stop disabling link 132 can be made with the fuel, air, and electrical system 134 of the vehicle 130. The enhanced version incorporates a satellite 136 for signal receipt and transmission from the vehicle 130 in which the detector system 10 is placed to a monitoring site and monitoring equipment 138. As shown in FIG. 16, a detection signal 140 would be sent to the satellite 136 by the detection system 10 upon detection of a bomb or explosive 142 hidden in the vehicle 130. The satellite 136 would then transmit an alert signal 144 to the monitoring site 138 with the signal 144 containing the relevant data to evaluate the nature of the threat. The monitoring site 138 would then transmit a stall to stop signal 146 to the detection system 10 to lock the vehicle 130 and/or disable the electrical system of the vehicle 130 thereby disabling the vehicle 130, preventing access to the vehicle 130 by locking the vehicle 130, and preventing any terrorist in the vehicle 130 from escaping.

The detector case 12 can be modified and adapted for inclusion with cell phone cases, satellite cell phone cases, laptop cases, notebook PC cases, PDA cases, carry-on cases, suitcases, and briefcases. In addition, the basic monitoring terminal or PC 114, as shown in FIGS. 5 and 15, can be adapted and incorporated to include desktop PCs, notebook PCs, laptops, cell phones, LCD monitors, and satellite monitoring.

The system 10 and the watchtower 112, along with the satellite 136 and the monitoring site 138 can be adapted or incorporated with cell phone towers and satellites for use with satellite communication and/or a cell tower, wi-fi, wi-max, broadband, GPS, navigation, radio frequency interconnected to a central processing unit (cpu), such as cpu 40, a transceiver and monitoring equipment to include but not to be limited to computers, laptops, notebooks, PC's, and cell phones for the receipt and transmission of signals therebetween. The aforementioned telecommunication and radio communication means can be interactive with any type of motive vehicle that includes but is not limited to cars, trucks, vans, SUVs, trains, subways, boats, ships and airplanes, and which is reported stolen, experiences a loss of brakes, or a bomb, explosives or other types of chemical, biological, radiological, or nuclear agents are detected within, upon, affixed or mounted to the vehicle and which detection causes an automatic signal transmission or a signal transmission is activated when a call is made to the monitoring station by an authorized person. The authorized individual includes but is not limited to the owner, pilot, conductor, captain, police highway patrol, security guard and military personnel to the monitoring equipment for activating a vehicle slowdown or stall-to-stop disabling system that similar to the disabling system 126 shown in FIG. 16, or incorporating features of the system 126 shown in FIG. 16, from the monitoring equipment to the vehicle. The activation of the stall-to-stop disabling means or the vehicle slowdown disables or engages the computer, electrical, fuel and air systems of the vehicle or a combination of the computer, electrical, fuel and air systems that include but are not limited to the brakes, foot peddle, lights, speed controls, ignition, steering, transmission, and the horsepower of the motor.

In addition, the basic stall-to-stop disabling means or the vehicle slowdown means and device can be adapted, modified or designed to include: an open bust or open platform for integrating any new and innovative technology; warning lights indicators; sound alarm indicators; voice alarm indicators; a cell phone to transmit to the vehicle a signal for slowing and halting the vehicle; and a lock disabling system or means to lock a thief or terrorist inside the vehicle after a transmission is received or sent. Open bust or open platform also refers to the compatibility of the detector case 12, or the incorporation of its features in cell phone cases, satellite cell phone cases, laptop cases, notebook PC cases, PDA cases, carry-on cases, briefcases, and suitcases, etc., with other communication, transmission and surveillance systems whereupon the detector case 12, and its features, can be seamlessly integrated with other new and emerging systems and technologies.

Figure 17:
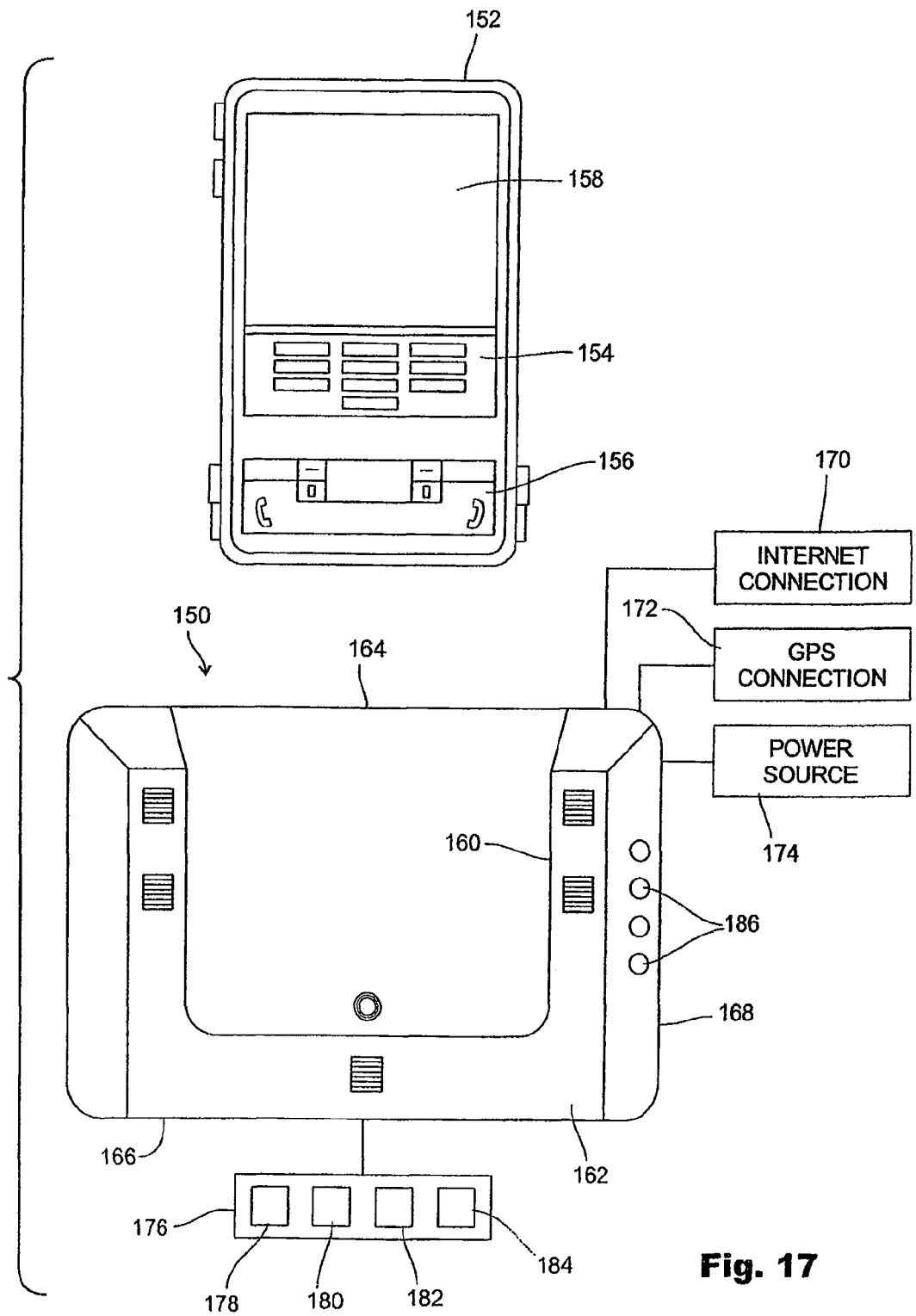
FIG. 17 is a perspective view of the multi sensor detection and lock disabling system of the present invention illustrating the incorporation of the features and elements of the detector case to a cell phone and cell phone case.

Thus, as shown more specifically in FIG. 17, by way of a representative example the features and elements of the detector case 12 are shown as being incorporated into cell phone detector case 150 and associated cell phone monitor 152. The cell phone monitor 152 includes the standard keypad functions 154 and more specialized system use (ring tone, email, photos, texting) functions 156 as well as a viewing screen 158. The cell phone detector case 150 includes a recharging cradle or seat 160, a front side 162, a top 164, a bottom 166, and a pair of opposed sides 168. At the back of the cell phone detector case 150 are connections, contacts, and ports for at least an Internet connection 170, a GPS connection 172, and a contact, plug, or port for a power source 174. The power source for the cell phone detector case 150 can be any conventional rechargeable battery source or standard electrical power from a standard electrical receptacle or outlet.

As shown in FIG. 17, the cell phone detector case 150 includes one or more sensor/detector units, cells, or components 176 built into and incorporated into the case 150. The detector 176 includes generally disposed at the front 162 of the case 150 the following types of indicators: a sound alarm indicator 178, a readings panel 180, a sensor 182 for detecting one or more specific types of agents, elements, chemicals, compounds, etc., and a light alarm indicator 184. The sensor/detector 176 will be interconnected to the power source 174. In addition, mounted on and externally visible on the sides 168 or front 162 of the case 150 are a plurality of color coded indicator lights 186 with each light 186 corresponding to a specific agent, element, chemical, compound, etc., and lighting up when that agent is detected by the sensor/detector 176. The color coded indicator lights 186 will be electrically interconnected to the sensor/detectors 176 via any standard microprocessor. The cell phone detector case 150 and cell phone monitor 152 thus comprise a hand-held, easily portable and transportable detection means that is both effective and unobtrusive in its disposition and use.

Figure 18:
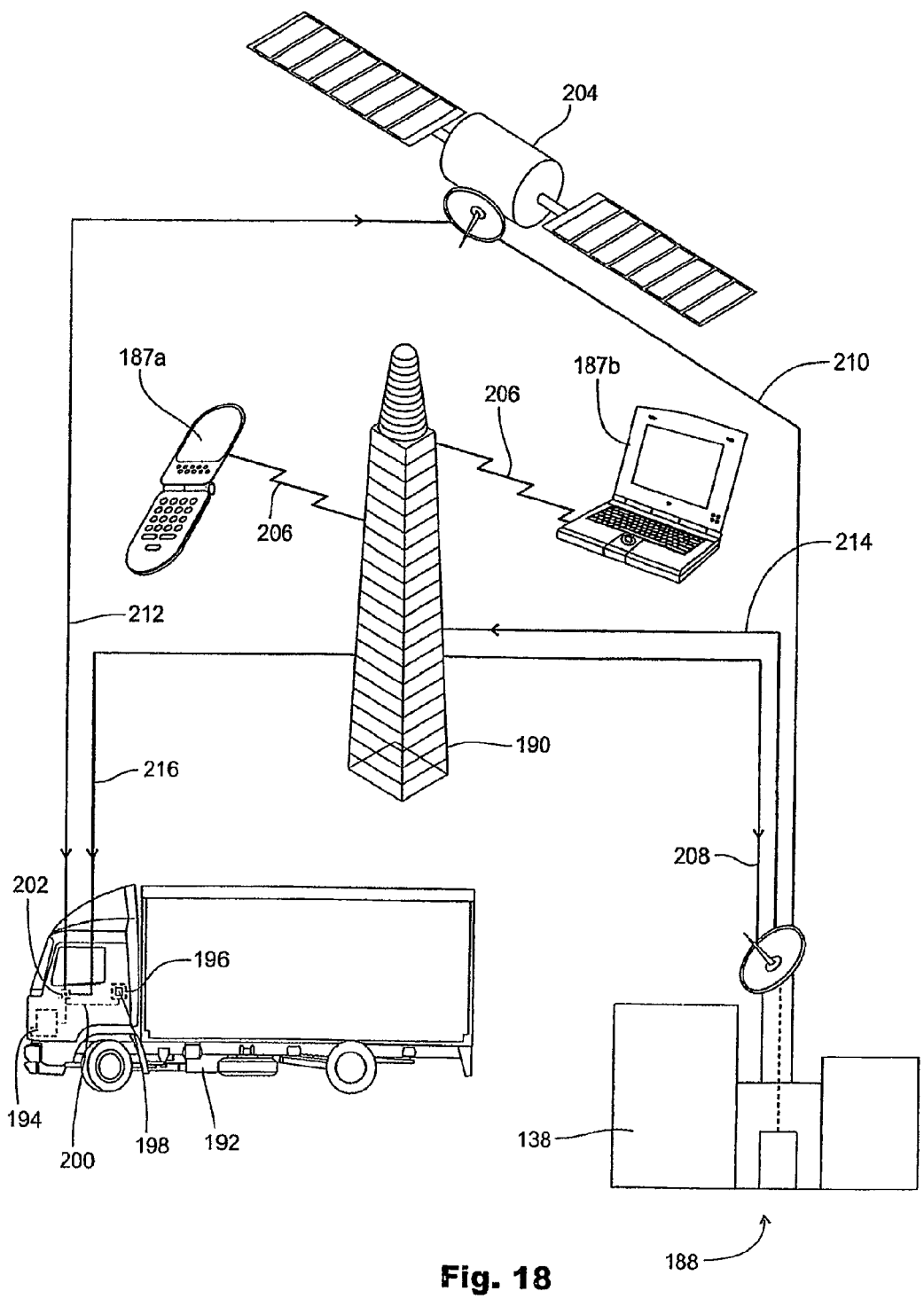
FIG. 18 is a perspective view of the multi sensor detection and lock disabling system of the present invention illustrating the incorporation of a GPS satellite, a monitoring site and a cell phone tower for communicating to and with an electronic device such as a laptop computer or a cell phone for transmitting signals to a vehicle for activating an onboard stall-to-stop device for bringing the vehicle to a halt.
Figure 19:
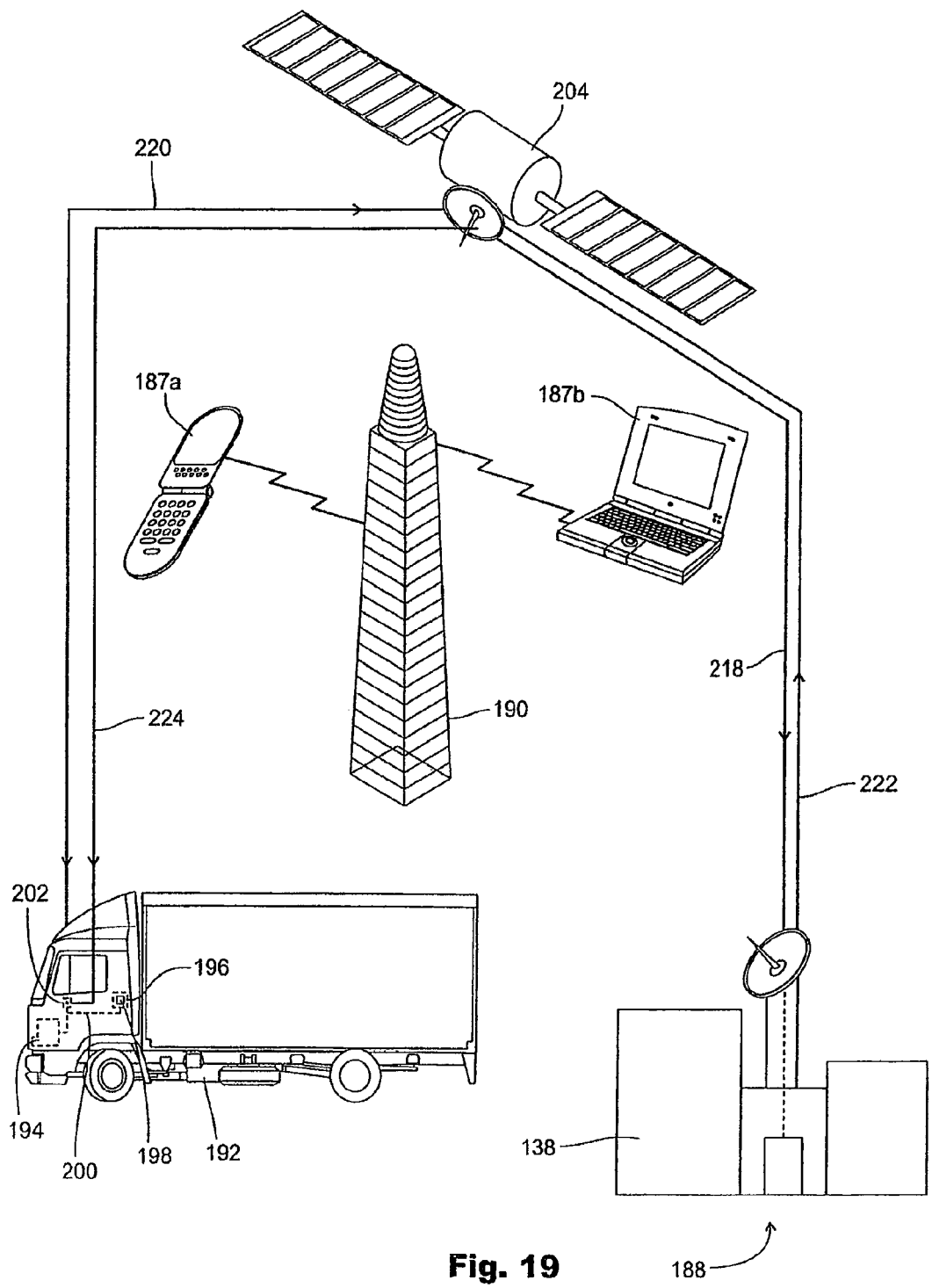
FIG. 19 is a perspective view of the multi sensor detection and lock disabling system of the present invention illustrating the use of a GPS satellite in conjunction with the monitoring site and monitoring equipment to relay commands and signals to the cpu or transceiver of the vehicle for stopping or locking the vehicle in response to a signal that a certain type of event (detection of a bomb, engine failure or malfunction or unauthorized use) has occurred or is in process

FIGS. 18 and 19 illustrate representative examples of the integration of portable electronic communication or telecommunication devices such as a cell phone 187a and/or a laptop computer 187b with the monitoring equipment 138 located at a predesignated monitoring site 188, and operating in conjunction with either a satellite and/or a cell phone tower 190 to transmit and receive signals and commands among each other and to a vehicle 192, such as a truck, as part of a stall-to-stop disabling system for slowing and stopping the vehicle 192 and locking a thief, terrorist, or unauthorized individual in the vehicle 192 if needed. A wide range of events can trigger and initiate the stall-to-stop system and the locking or lock disabling system and mechanism, and the event doesn't have to be limited to the detection of a bomb or a chemical, biological, or radiological agent, element, or compound. The events can include, but is not limited to, detection of an engine problem to engine failure to the unauthorized use (stealing) of the vehicle 192. The vehicle 192 includes an electromotive system 194 that comprises, among other components, an onboard computer(s), electrical, fuel and air systems, as well as brakes, ignition, steering, and transmission. Also integrated with and capable of communicating with the vehicle's 192 electromotive system 194 is a stall-to-stop system while a lock disabling mechanism 196 is able to engage and disengage or disable the vehicle's 192 locking mechanism 198 upon receipt of the appropriate commands via a lock disabling communication channel or link 200. This link 200 can also accommodate the stall-to-stop system commands and signals, and thus is a multi-channel communication link. A CPU or a transceiver 202 is programmed to receive signals from the cell phone tower 190 and/or to a GPS satellite 204 and is interconnected with the stall-to-stop system and the lock disabling system 196 via link 200 for engaging the electromotive system 194 and actuating the lock disabling system 196 to stop the vehicle 192 and lock inside the vehicle 192 anyone such as a thief, terrorist or other unauthorized individual.

A representative example for stopping, disabling, and locking the vehicle 192 that utilizes the cell phone tower 190 wherein the activation and/or distress signal 206 originates from the cell phone 187a or the laptop 187b and such activation signal 206 travels to the cell phone tower 190 that is nearest the current location of the vehicle 192. A signal 208 is then transmitted to the monitoring site 188 and specific monitoring equipment 138 that can also include but is not limited to cell phones, laptops, desktop PC's, notebook PC's and LCD monitors. The monitoring site 138 then communicates by signal 210 to the GPS satellite 204 that an original or activation signal has been received and then the GPS satellite 204 locates and communicates by multiplex signal 212 with the CPU or transceiver 202 on the vehicle 192 and exchanges information on the type of problem, situation, location, and vehicle speed. The monitoring equipment 138 then transmits a signal 214 to the cell phone tower 190 that communicates with the transceiver 202 and/or CPU of the vehicle 192 to initiate or execute any commands that will actuate the stall-to-stop disabling link 200 and lock disabling system 196 for bringing the vehicle 192 to a halt and actuating the vehicle's 192 locking mechanism 198 for locking the thief, terrorist, or other unauthorized person inside the vehicle 192 if needed.

FIG. 19 illustrates a representative example wherein the stall-to-stop system and the lock disabling system 196 are utilized in conjunction with the GPS satellite 204. In FIG. 19 a signal has traveled to the satellites nearest the vehicle's 192 current location and then the signal 218 has traveled to the monitoring equipment 138 and monitoring site 188 which can include but is not limited to satellite cell phones, satellite monitors, cell phones, laptops, desktop PC's, notebook PC's, and LCD monitors. The OPS satellite 204 then locates and communicates with the CPU and/or transceiver 202 on the vehicle 192 via a multiplex (two-way) signal 220 in order to exchange information on such distress and danger event parameters as the specific problem situation, location, and vehicle speed. The monitoring equipment 138 then transmits a signal 222 back to the GPS satellite 204 that in turn communicates via another signal 224 with the CPU and/or transceiver 202 to execute any commands to the stall-to-stop system for executing the disengagement of the vehicle's 192 electromotive system 194 for bringing the vehicle 192 to a halt and for actuating the lock disabling system 196 to direct the lock disabling link 200 to actuate the locking mechanism 198 thereby locking the vehicle 192 and anyone inside the vehicle 192.

While the invention has been shown and described in a preferred embodiment, it will be apparent to those skilled in the art that numerous alterations, modifications, and variations will possible and practicable without departing from the spirit and scope of the invention as set forth by the appended claims.

The present invention comprehends a chemical/biological/radiological/nuclear/explosive/human/contraband detector unit with a disabling locking system for protecting products that can be grouped into several product groupings, from terrorist activity, and also for preventing unauthorized access to and tampering with the storage and transport of ordnance and weapons. The products grouped into what may be referred to as Product grouping 1 (storage & transportation) include, but are not limited to, cargo containers, shipping containers, tractor trailers, mail carriers, mail boxes, airplanes, subways, cargo planes, freight train cars, (UPS, FedEx), airport lockers, news racks (coin and non-coin operated), mail drop boxes, cluster mail boxes, keyed mail boxes, min-storage houses and buildings, bicycle lockers, stadium lockers, school lockers, cars, trucks, campers, buses, vans, UAVs, UGVs, and utility vehicles; the products grouped into what may be referred to as Product grouping 2 (sensors) include, but are not limited to, chemical, biological, radiological, explosive and nuclear detectors, motion sensors, door sensors, speed sensors, biometric sensors, glass break sensors, plastic film on glass, high security locks, tampering labels, door sensors, disabling locking systems, vehicle detectors and satellite disabling locking systems, detection of humans, detection of contraband, temperature, and shock levels; the products grouped into what may be referred to as Product grouping 3 (detector case; modified and adapted) include, but are not limited to, cell phone cases, satellite cell phone cases, laptop cases, notebook PC cases, PDA cases, carry-on cases, suitcases, eyeglass, briefcases, detector cases of locks, detector cases of tags, detector cases that is mounted to, detector cases that is affixed to, detector cases that is outside of, detector cases that is inside of, and detector cases that is adjacent to; the products grouped into what may be referred to as Product grouping 4 (monitoring & communication devices) include, but are not limited to, mobile communication devices, mobile communication units, portable communication devices, portable communication equipment, wired communication devices, wireless communication devices, monitoring sites, monitoring terminals, web servers, desktop PCs, notebook PCs, laptops, satellite cell phones, cell phones, UMTS phones, PDAs, LCD monitors, and satellite monitoring, remote control key fobs, two-way communication key fobs, handhelds; the products grouped into what may be referred to as Product grouping 5 (communication methods) include, but are not limited to, Bluetooth, Wi-Fi, Wi-Max, Internet, Ethernet, Broadband, Network Bandwidth, Wireless, Wired, Text Messaging, Cellular, Satellite, Telematics, Wide Area Network (WAN), Wireless Wide Area Network (WWAN), Local Area Network (LAN), Radio Frequency (RF), Broadband Wireless Access (BWA), Global Positioning System (GPS), General Packet Radio Services (GPRS), Global System for Mobile (GSM), Wideband Code Division Multiple Access (W-CDMA), Universal Mobile Telecommunications System (UMTS), Short Message Service (SMS); the products grouped into what may be referred to as Product grouping 6 (biometrics) include, but are not limited to, fingerprint recognition, voice recognition, face recognition, band geometry, retina scan, iris scan and signature. the products grouped into what may be referred to as Product grouping 7 (authorized person) include, but are not limited to, owner, pilot, conductor, captain, drivers of vehicles identified as high security, airport security, police, highway patrol, security guard, military personnel, HAZMAT, CIA, FBI, Secret Service, port security personnel, border security personnel, first responders, monitoring sites and terminal personnel. The multi sensor detection system includes the capability to disable an existing lock or activate a lock located inside or outside any of the products named in the product grouping categories upon activation of a sensor or detector included in the system. This is a significant feature for the multi sensor detection system as it prevents unauthorized, unequipped and untrained entry and access to the product thus preventing further contamination of the site and to individuals in the area.

The invention claimed is:

1. A communication device of at least one of a cell phone, a smart phone, a desktop, a handheld, a PDA, a laptop, or a computer terminal for monitoring products, interconnected to a product for communication therebetween, comprising:
   at least one of a central processing unit (CPU) for executing and carrying out the instructions of a computer program, a network processor which is specifically targeted at the networking application domain, or a front end processor for communication between a host computer and other devices;
   a transmitter for transmitting signals and messages to at least one of plurality product groups based on the categories of a multi-sensor detection device, a maritime cargo container, a cell phone detection device, or a locking device;
   a receiver for receiving signals, data or messages from at least one of plurality product groups based on the categories of a multi-sensor detection device, a maritime cargo container, a cell phone detection device, or a locking device;
   at least one satellite connection, Bluetooth connection, WiFi connection, internet connection, radio frequency (RF) connection, cellular connection, broadband connection, long and short range radio frequency (RF) connection, or GPS connection;
   the communication device is at least a fixed, portable or mobile communication device interconnected to a fixed, portable or mobile product, capable of wired or wireless communication therebetween; and
   whereupon the communication device, is interconnected to a product equipped to receive signals from or send signals to lock or unlock doors, activate or deactivate security systems, activate or deactivate multi-sensor detection systems, or to activate or deactivate cell phone detection systems;
   wherein the communication device receives a signal via any of one or more products listed in any of the plurality of product grouping categories;
   wherein at least one satellite connection, Bluetooth connection, WiFi connection, internet connection, radio frequency (RF) connection, cellular connection, broadband connection, long and short range radio frequency (RF) connection is capable of signal communication with the transmitter and the receiver of the communication device and transceivers of the products;
   wherein the communication device is equipped with a biometric lock disabler that incorporates at least one of a fingerprint recognition, voice recognition, face recognition, hand geometry, retina scan, iris scan and signature such that the communication device that is at least one of the cell phone, the smart phone, the desktop, the handheld, the PDA, the laptop or the computer terminal is locked by the biometric lock disabler to prevent unauthorized use;
   wherein the only type or types of communication with the transmitter and the receiver of the communication device and transceivers of the products is a type or types selected from the group consisting of satellite, Bluetooth, WiFi, internet, radio frequency (RF), cellular, broadband, and long and short range radio frequency (RF).

2. Monitoring equipment of at least one of the products grouped together by common features in the product groupings category of design similarity (i.e. computer terminal, personal computer (PC), laptop, desktop, notebook, handheld, cell phone, PDA or smart phone) interconnected to a product for communication therebetween, comprising:
   at least one of a central processing unit (CPU) for executing and carrying out the instructions of a computer program, a network processor which is specifically targeted at the networking application domain, or a front end processor for communication between a host computer and other devices;
   a transmitter for transmitting signals and messages to at least one of plurality product groups based on the categories of a multi-sensor detection device, a maritime cargo container, a cell phone detection device;
   a receiver for receiving signals, data or messages from at least one of plurality product groups based on the categories of a multi-sensor detection device, a maritime cargo container, a cell phone detection device;
   a lock disabling mechanism that is able to engage (lock) and disengage (unlock) and disable (make unavailable) a product's lock, wherein the lock disabling mechanism disables the product's lock after a specific number of tries by an unauthorized user to disengage the lock by maintaining the product's lock in the current state of the product's lock regardless of input entered to change the state of the product's lock by the unauthorized user;
   at least one satellite connection, Bluetooth connection, WiFi connection, internet connection, radio frequency (RF) connection, cellular connection, broadband connection, long and short range radio frequency (RF) connection, or GPS connection;
   monitoring equipment of at least a fixed, portable or mobile monitoring equipment interconnected to a fixed, portable or mobile product, capable of wired or wireless communication therebetween; and
   whereupon the monitoring equipment, is interconnected to a product equipped to receive signals from or send signals to the lock disabling mechanism that is able to engage and disengage or disable the lock, activate or deactivate security systems, activate or deactivate multi-sensor detection systems, or to activate or deactivate cell phone detection systems;
   wherein the monitoring equipment is implemented by business or government at a minimum cost by products grouped together by common features in at least one of several product groupings of design similarity;
   wherein at least one satellite connection, Bluetooth connection, WiFi connection, internet connection, radio frequency (RF) connection, cellular connection, broadband connection, or long and short range radio frequency (RF) connection is in signal communication with the transmitter and the receiver of the monitoring equipment and transceivers of the products.

3. Monitoring equipment of at least one of the products grouped together by common features in the product groupings category of design similarity (i.e. computer terminal, personal computer (PC), laptop, desktop, notebook, handheld, cell phone, PDA or smart phone) interconnected to a product for communication therebetween, comprising:

at least one of a central processing unit (CPU), a network processor, or a microprocessor for executing and carrying out the instructions of a computer program or application which is specifically targeted at the networking application domain, for communication between the monitoring equipment and any of a plurality product groups based on the categories of a multi-sensor detection device, a maritime cargo container device, or a locking device;

a transmitter for transmitting signals and messages to at least one of plurality product groups based on the categories of a multi-sensor detection device, a maritime cargo container device, or a locking device;

a receiver for receiving signals, data or messages from at least one of plurality of product groups based on the categories of a multi-sensor detection device, a maritime cargo container device or a locking device, wherein the signals, data or messages are of agents of an item of interest (IOI);

at least one satellite connection, Bluetooth connection, WiFi connection, internet connection, radio frequency (RF) connection, cellular connection, broadband connection, or GPS connection;

the monitoring equipment is at least a fixed, portable or mobile monitoring equipment interconnected to a fixed, portable or mobile product, capable of wired or wireless communication therebetween; and whereupon the monitoring equipment, is capable of the activation or deactivation of at least one of plurality product groups based on the categories of a multi-sensor detection device, a maritime cargo container device or a locking device;

wherein at least one satellite connection, Bluetooth connection, WiFi connection, internet connection, radio frequency (RF) connection, cellular connection, broadband connection, for signal communication with the transmitter and the receiver of the monitoring equipment and transceivers of the products;

at least one tag that is read by the monitoring equipment that is capable of wireless near-field communication to achieve detection of at least one of a chemical agent, a biological agent, a radiological agent, a nuclear agent, or an explosive agent which allows radio frequency (RF) data to be received and transferred between the tag and the monitoring equipment.

4. A built-in, embedded multi sensor detection system for monitoring products with a plurality of sensors detecting at least two agents selected from the group consisting of chemical, biological, radiological, explosive, human, and contraband agents;

comprising a built-in sensor array or fixed detection device into the product that detects agents by means of two or more sensors combined from the following list of sensors: a chemical sensor, a biological sensor, an explosive sensor, a human sensor, a contraband sensor, and a radiological sensor;

comprising a communication device of at least one of a cell phone, a smart phone, a desktop, a handheld, a PDA, a laptop, or a computer terminal for monitoring products, interconnected to a built-in sensor array or fixed detection device for communication therebetween, wherein the communication device is equipped with a biometric lock disabler that incorporates at least one of a fingerprint recognition, voice recognition, face recognition, hand geometry, retina scan, iris scan and signature such that the communication device that is at least one of the cell phone, the smart phone, the desktop, the handheld, the PDA, the laptop or the computer terminal is locked by the biometric lock disabler to prevent unauthorized use;

wherein the built-in embedded multi sensor detection device receives a signal via any of one or more products listed in any of the plurality of product grouping categories; and wherein, when an alarm occurs, the built-in, embedded multi sensor detection system communicates the alarm by way of at least one of the products grouped together by common features in the product groupings category of design similarity (i.e. product-to-product, product-to-satellite, product-to-cellular, product-to-long or short range radio frequency, product-to-radio frequency (RF), product-to-internet, product-to-broadband, product-to-smartphone or cell phone, product-to-computer at monitoring site, product-to-WiFi, product-to-handheld, or product-to-laptop or desktop) for communication therebetween;

wherein the built-in embedded multi sensor detection device is implemented by business or government at a minimum cost by products grouped together by common features in at least one of several product groupings of design similarity.

5. A built-in multi sensor detection system for monitoring products with a plurality of sensors detecting at least two agents selected from the group consisting of chemical, biological, radiological, explosive, human, and contraband agents, comprising:

a built-in sensor array or fixed detection device into the product that detects agents by means of two or more sensors combined from the following list of sensors: a chemical sensor, a biological sensor, an explosive sensor, a human sensor, a contraband sensor, and a radiological sensor;

monitoring equipment of at least one of the products grouped together by common features in the product groupings category of design similarity (i.e. computer terminal, personal computer (PC), laptop, desktop, notebook, handheld, cell phone, PDA or smart phone) for the receipt and transmission of signals therebetween;

wherein the built-in multi sensor detection device is built in any of one or more products listed in any of the plurality of product grouping categories to include but not limited to a maritime cargo container, a lock, or monitoring equipment (i.e., a computer terminal, personal computer (PC), a cell phone, a smart phone, a desktop, a handheld, a PDA, a laptop);

wherein the built-in multi sensor detection device is implemented by business or government at a minimum cost by products grouped together by common features in at least one of several product groupings of design similarity;

a light alarm indicator that has a plurality of colored lights that correspond to specific ones of the at least two agent;

wherein, when the light alarm indicator lights to indicate an alarm occurs, the built-in multi sensor detection system communicates the alarm by way of at least one of the products grouped together by common features in the product groupings category of design similarity (i.e. product-to-product, product-to-satellite, product-to-cellular, product-to-radio frequency (RF), product-to-internet, product-to-broadband, product-to-smartphone or cell phone, product-to-computer at monitoring site, product-to-WiFi, product-to-handheld, or product-to-laptop or desktop) for the receipt and transmission of signals therebetween.

6. A built-in multi sensor detection system for detecting at least two items selected from the group consisting of chemical agent, biological agent, radiological agent, explosive agent, human agent, contraband agent, motion, perimeter, temperature, tampering, theft, and breach, comprising:
- a built-in sensor array or fixed detection device into a product that detects items by means of at least two sensors from the following list of sensors: a chemical sensor, a biological sensor, an explosive sensor, a human sensor, a contraband sensor, and a radiological sensor;
- monitoring equipment of at least one of the products grouped together by common features in the product groupings category of design similarity (i.e. computer terminal, personal computer (PC), laptop, desktop, notebook, handheld, cell phone, PDA or smart phone) for the receipt and transmission of signals therebetween;
- wherein the built-in, multi sensor detection device is built in any of one or more products listed in any of the plurality of product grouping categories to include but not limited to a maritime cargo container, a lock, or monitoring equipment (i.e., a computer terminal, personal computer (PC), a cell phone, a smart phone, a desktop, a handheld, a PDA, a laptop);
- wherein, when an alarm occurs, the built-in multi sensor detection system communicates the alarm by way of at least one of the products grouped together by common features in the product groupings category of design similarity (i.e. product-to-product, product-to-satellite, product-to-cellular, product-to-radio frequency (RF), product-to-internet, product-to-broadband, product-to-smartphone or cell phone, product-to-computer at monitoring site, product-to-WiFi, product-to-handheld, or product-to-laptop or desktop) for the receipt and transmission of signals therebetween,
- at least one tag that is read by the monitoring equipment that is capable of wireless near-field communication to achieve detection of at least one of the chemical agent, the biological agent, the radiological agent, the explosive agent, the human agent, the contraband agent, the motion, the perimeter, the temperature, the tampering, the theft, and the breach which allows radio frequency (RF) data to be received and transferred between the tag and the monitoring equipment.

7. A multi-sensor detection system for detecting at least one explosive, nuclear, contraband, chemical, biological, human, or radiological agents and compounds, comprising:
- a plurality of sensors for detecting at least one chemical, biological, radiological, explosive, nuclear, human or contraband agents and compounds and capable of being disposed within, on, upon or adjacent a multi sensor detection device;
- monitoring equipment comprising at least one of plurality product groups based on the categories of a computer, laptop, notebook, PC, handheld, cell phone, PDA or smart phone for the receipt and transmission of signals therebetween;
- at least one cell phone tower interconnected to the monitoring equipment for sending signals thereto and receiving signals therefrom or at least one satellite capable of transmitting signals to the monitoring equipment;
- at least one satellite or at least one cell phone tower capable of signal communication between the multi sensor detection device and the monitoring equipment;
- at least one internet connection capable of communication between the multi sensor detection device and the monitoring equipment;
- whereupon a signal sent to a receiver of the multi sensor detection device from a satellite; or to a cell phone tower; or through short and/or long range radio frequency; causes a signal to be sent to the monitoring equipment that includes location data and sensor data;
- wherein the monitoring equipment or multi sensor detection device receives a signal via any of one or more products listed in any of the plurality of product grouping categories;
- wherein at least one satellite connection, Bluetooth connection, WiFi connection, internet connection, radio frequency (RF) connection, cellular connection, broadband connection, long and short range radio frequency (RF) connection is capable of signal communication with the transmitter and the receiver of the monitoring equipment or multi sensor detection device and transceivers of the products;
- wherein the monitoring equipment is equipped with a biometric lock disabler that incorporates at least one of a fingerprint recognition, voice recognition, face recognition, hand geometry, retina scan, iris scan and signature such that the monitoring device that is at least one of the computer, the laptop, the notebook, the PC, the handheld, the cell phone, the PDA, or the smart phone is locked by the biometric lock disabler to prevent unauthorized use;
- wherein the only type or types of communication with the transmitter and the receiver of the communication device and transceivers of the products is a type or types selected from the group consisting of satellite, Bluetooth, WiFi, internet, radio frequency (RF), cellular, broadband, and long and short range radio frequency (RF).

8. A multi-sensor detection system for detecting at least one explosive, nuclear, contraband, chemical, biological, human, or radiological agents and compounds, comprising:
- a plurality of sensors for detecting at least one chemical, biological, radiological, explosive, nuclear, human or contraband agents and compounds and capable of being disposed within, on, upon or adjacent a multi sensor detection device;
- monitoring equipment of at least one of the products grouped together by common features in the product groupings category of design similarity (i.e. computer terminal, personal computer (PC), laptop, desktop, notebook, handheld, cell phone, PDA or smart phone) for the receipt and transmission of signals therebetween, wherein the monitoring equipment is equipped with a lock disabling mechanism that is able to engage (lock) and disengage (unlock) and disable (to make unavailable) a product's lock, wherein the lock disabling mechanism disables the product's lock after a specific number of tries by an unauthorized user to disengage the lock by maintaining the product's lock in the current state of the product's lock regardless of input entered to change the state of the product's lock by the unauthorized user;
- at least one cell phone tower interconnected to the monitoring equipment for sending signals thereto and receiving signals therefrom; or at least one satellite capable of transmitting signals to the monitoring equipment;
- at least one satellite or at least one cell phone tower capable of signal communication between the multi sensor detection device and the monitoring equipment;
- at least one internet connection capable of communication between the multi sensor detection device and the monitoring equipment; and whereupon a signal sent to a receiver of the multi sensor detection device from a satellite; or to a cell phone tower; or through short and/or long range radio frequency; causes a signal to be sent to the monitoring equipment that includes location data and sensor data;

wherein the multi sensor detection device is implemented by business or government at a minimum cost by products grouped together by common features in at least one of several product groupings of design similarity;

wherein the multi sensor detection device for any of one or more products listed in any of the plurality of product grouping categories to include but not limited to a maritime cargo container, a lock, or monitoring equipment (i.e., a computer terminal, personal computer (PC), a cell phone, a smart phone, a desktop, a handheld, a PDA, a laptop);

wherein at least one satellite connection, Bluetooth connection, WiFi connection, internet connection, radio frequency (RF) connection, cellular connection, broadband connection, or long and short range radio frequency (RF) connection is in signal communication with the transmitter and the receiver of the monitoring equipment or multi sensor detection device and transceivers of the products.

9. A multi-sensor detection system for detecting at least one explosive, nuclear, contraband, chemical, biological, human, or radiological agents and compounds, comprising:

a plurality of sensors for detecting at least one chemical, biological, radiological, explosive, nuclear, human or contraband agents and compounds and capable of being disposed within, on, upon or adjacent a multi sensor detection device, wherein at least one of the sensors is capable of detecting agents of an item of interest (IOI);

monitoring equipment of at least one of the products grouped together by common features in the product groupings category of design similarity (i.e. computer terminal, personal computer (PC), laptop, desktop, notebook, handheld, cell phone, PDA or smart phone) for the receipt and transmission of signals therebetween;

at least one satellite or at least one cell phone tower capable of signal communication between the multi sensor detection device and the monitoring equipment;

at least one internet connection capable of communication between the multi sensor detection device and the monitoring equipment;

whereupon a signal sent to a receiver of the multi sensor detection device from a satellite; or from a cell phone tower; or through short and/or long range radio frequency; causes a signal to be sent to the monitoring equipment that includes location data and sensor data;

wherein the multi sensor detection device for any of one or more products listed in any of the plurality of product grouping categories to include but not limited to a maritime cargo container, a lock, or monitoring equipment (i.e., a computer terminal, personal computer (PC), a cell phone, a smart phone, a desktop, a handheld, a PDA, a laptop);

wherein at least one satellite connection, Bluetooth connection, WiFi connection, internet connection, radio frequency (RF) connection, cellular connection, or broadband connection, is in signal communication with the transmitter and the receiver of the monitoring equipment and transceivers of the products;

at least one tag that is read by the monitoring equipment that is capable of wireless near-field communication to achieve detection of at least one of the explosive agent, the nuclear agent, the contraband agent, the chemical agent, the biological agent, the human agent, or the radiological agent which allows radio frequency (RF) data to be received and transferred between the tag and the monitoring equipment.

\* \* \* \* \*